US008815977B2

(12) United States Patent
Ito et al.

(10) Patent No.: US 8,815,977 B2
(45) Date of Patent: Aug. 26, 2014

(54) PROCESS FOR PRODUCING CONJUGATED DIENE-BASED POLYMER, CONJUGATED DIENE-BASED POLYMER, AND CONJUGATED DIENE-BASED POLYMER COMPOSITION

(75) Inventors: Mana Ito, Ichihara (JP); Katsunari Inagaki, Ichihara (JP); Mayumi Oshima, Chuo-ku (JP)

(73) Assignee: Sumitomo Chemical Company, Ltd., Tokyo (JP)

( * ) Notice: Subject to any disclaimer, the term of this patent is extended or adjusted under 35 U.S.C. 154(b) by 227 days.

(21) Appl. No.: 13/357,371

(22) Filed: Jan. 24, 2012

(65) Prior Publication Data

US 2012/0190771 A1 Jul. 26, 2012

(30) Foreign Application Priority Data

Jan. 24, 2011 (JP) ................................ 2011-011713

(51) Int. Cl.
*C08L 43/04* (2006.01)
*C08F 230/08* (2006.01)

(52) U.S. Cl.
USPC ............ 523/150; 526/279; 526/180; 524/547

(58) Field of Classification Search
USPC .................... 523/150; 524/547; 526/279, 180
See application file for complete search history.

(56) References Cited

U.S. PATENT DOCUMENTS 3,485,857 A 12/1969 Speier
5,128,416 A 7/1992 Imai et al.
5,189,109 A 2/1993 Imai et al.
5,916,961 A 6/1999 Hergenrother et al.
2009/0247696 A1 * 10/2009 Fujii et al. .................... 524/572
2010/0056703 A1 3/2010 Oshima

FOREIGN PATENT DOCUMENTS

JP 11-106563 4/1999
JP 2010-077386 4/2010

* cited by examiner

*Primary Examiner* — Robert D. Harlan
(74) *Attorney, Agent, or Firm* — Foley & Lardner LLP

(57) ABSTRACT

The present invention provides a process for producing a conjugated diene-based polymer, comprising polymerizing a monomer component containing a conjugated diene compound and a silicon-containing vinyl compound using a polymerization initiator represented by the following formula (1)

$$\begin{matrix} R^{12} \\ \quad\diagdown \\ \quad\quad N - R^{11} - M, \\ \quad\diagup \\ R^{13} \end{matrix} \quad (1)$$

wherein, $R^{11}$ represents a hydrocarbylene group having 6 to 100 carbon atoms, $R^{12}$ and $R^{13}$ represent a hydrocarbyl group optionally having a substituent, or a trihydrocarbylsilyl group, or $R^{12}$ and $R^{13}$ are bonded to represent a hydrocarbylene group optionally having, as a hetero atom, at least one kind atom selected from the atomic group consisting of a silicon atom, a nitrogen atom and an oxygen atom.

6 Claims, No Drawings

PROCESS FOR PRODUCING CONJUGATED DIENE-BASED POLYMER, CONJUGATED DIENE-BASED POLYMER, AND CONJUGATED DIENE-BASED POLYMER COMPOSITION

BACKGROUND OF THE INVENTION

1. Field of the Invention

The present invention is filed claiming the priority of Japanese Patent Application No. 2011-011713 filed on Jan. 24, 2011 under the Paris Convention, the entire content of which is incorporated herein by reference.

The present invention relates to a process for producing a conjugated diene-based polymer, a conjugated diene-based polymer, and a conjugated diene-based polymer composition.

2. Description of the Related Art

In recent years, with an increase in concern about environmental problems, requirements of fuel cost saving properties on an automobile have been increasing, and a rubber composition used in tires for automobiles has also been required to be excellent in fuel cost saving. As a rubber composition for automobile tires, a rubber composition containing a conjugated diene-based polymer such as polybutadiene or a butadiene-styrene copolymer, and a reinforcing agent is used.

For example, as a polymer enhancing fuel cost saving properties and a polymer composition having good fuel cost saving properties, a polymer obtained by living anion polymerization of butadiene, styrene and bis(diethylamino)methylvinylsilane using alkyllithium as a polymerization initiator, and a polymer composition containing the polymer and silica are proposed in JP-A 2010-77386. A polymer obtained by living anion polymerization of butadiene and styrene using 3-dimethylaminopropyllithium as a polymerization initiator, and a polymer composition containing the polymer and silica are proposed in JP-A 11-106563.

SUMMARY OF THE INVENTION

However, polymer compositions using the above conventional conjugated diene-based polymer were not necessarily sufficiently satisfactory in fuel cost-saving properties.

Under such circumstances, an object of the present invention is to provide a process for producing a conjugated diene-based polymer from which a polymer composition excellent in fuel cost saving properties can be obtained, a conjugated diene-based polymer obtained by the process, and a polymer composition containing the conjugated diene-based polymer and a reinforcing agent.

A first aspect of the present invention relates to a process for producing a conjugated diene-based polymer comprising polymerizing a monomer component containing a conjugated diene compound and a silicon-containing vinyl compound, using a polymerization initiator represented by the following formula (1).

(1)

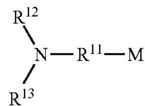

(wherein, $R^{11}$ represents a hydrocarbylene group having 6 to 100 carbon atoms, $R^{12}$ and $R^{13}$ represent a hydrocarbyl group optionally having a substituent, or a trihydrocarbylsilyl group, or $R^{12}$ and $R^{13}$ are bonded to represent a hydrocarbylene group optionally having, as a hetero atom, at least one kind atom selected from the atomic group consisting of a silicon atom, a nitrogen atom and an oxygen atom, and M represents an alkali metal atom.)

A second aspect of the present invention relates to a conjugated diene-based polymer produced by the above-mentioned production process.

A third aspect of the present invention relates to a conjugated diene-based polymer composition comprising the above-mentioned conjugated diene-based polymer and a reinforcing agent, wherein the content of the reinforcing agent is 10 parts by weight to 150 parts by weight per 100 parts by weight of the conjugated diene-based polymer.

According to the present invention, there can be provided a process for producing a conjugated diene-based polymer from which a polymer composition excellent in fuel cost saving properties can be obtained, a conjugated diene-based polymer obtained by the process, and a polymer composition containing the conjugated diene-based polymer and a reinforcing agent.

DETAILED DESCRIPTION OF THE INVENTION

Herein, a hydrocarbyl group represents a monovalent group obtained by removing one hydrogen atom from a hydrocarbon. A hydrocarbylene group represents a divalent group obtained by removing two hydrogen atoms from a hydrocarbon. A hydrocarbyloxy group represents a monovalent group having a structure in which a hydrogen atom of a hydroxy group is replaced with a hydrocarbyl group. A substituted amino group represents a group having a structure in which at least one hydrogen atom of an amino group is replaced with a monovalent atom other than a hydrogen atom or a monovalent group, or a group having a structure in which two hydrogen atoms of an amino group are replaced with a divalent group. A hydrocarbyl group having a substituent (hereinafter, referred to as substituted hydrocarbyl group in some cases) represents a monovalent group having a structure in which at least one hydrogen atom of a hydrocarbyl group is replaced with a substituent. A hydrocarbylene group having a hetero atom (hereinafter, referred to as hetero atom-containing hydrocarbylene group in some cases) represents a divalent group having a structure in which a carbon atom other than the carbon atom from which a hydrogen atom has been removed, and/or a hydrogen atom, of a hydrocarbylene group, is replaced with a group having a hetero atom (an atom other than a carbon atom and a hydrogen atom).

The process for producing a conjugated diene-based polymer of the present invention allows a monomer component containing a conjugated diene compound and a silicon-containing vinyl compound to be polymerized using a polymerization initiator represented by the following formula (1).

$$(R^{12})(R^{13})N—R^{11}—M \quad (1)$$

(wherein, $R^{11}$ represents a hydrocarbylene group having 6 to 100 carbon atoms, $R^{12}$ and $R^{13}$ represent a hydrocarbyl group optionally having a substituent, or a trihydrocarbylsilyl group, or $R^{12}$ and $R^{13}$ are bonded to represent a hydrocarbylene group optionally having, as a hetero atom, at least one kind atom selected from the atomic group consisting of a silicon atom, a nitrogen atom and an oxygen atom, and M represents an alkali metal atom.)

$R^{11}$ in the formula (1) is a hydrocarbylene group having 6 to 100 carbon atoms, preferably a hydrocarbylene group having 7 to 80 carbon atoms. The polymerization initiator may be a mixture comprised of a plurality of compounds represented by the formula (1) in which the numbers of carbon atoms of $R^{11}$ are different. When the number of carbon atom of $R^{11}$ is 5 or less, solubility of the polymerization initiator in a hydrocarbon solvent is reduced. When the number of carbon atom of $R^{11}$ is 100 or more, the molecular weight of the polymerization initiator is increased, and economical properties and handleability at the time of polymerization may be reduced in some cases $R^{11}$ in the formula (1) is preferably a group represented by the following formula (1-A).

$$\text{-}(CH_2)_n R^{14}\text{—} \quad (1\text{-}A)$$

(wherein, $R^{14}$ represents a hydrocarbylene group comprised of a structural unit of a conjugated diene compound and/or a structural unit derived from an aromatic vinyl compound, and n represents an integer of 1 to 10. $(CH_2)_n$ is bonded to a nitrogen atom of the formula (1).)

In the formula (1-A), $R^{14}$ represents a hydrocarbylene group comprised of a structural unit derived from a conjugated diene compound and/or a structural unit derived from an aromatic vinyl compound, preferably a hydrocarbylene group comprised of a structural unit derived from isoprene.

The number of the structural unit derived from a conjugated diene compound and/or the structural unit derived from an aromatic vinyl compound in $R^{14}$ is preferably 1 unit to 10 units, and more preferably 1 unit to 5 units.

In the formula (1-A), n is an integer of 1 to 10, preferably an integer of 2 to 4, and more preferably 3.

Examples of $R^{11}$ include a group in which 1 unit to 10 units of structural units derived from isoprene and a methylene group are bonded, a group in which 1 unit to 10 units of structural units derived from isoprene and an ethylene group are bonded, and a group in which 1 unit to 10 units of structural units derived from isoprene and a trimethylene group are bonded, and preferably a group in which 1 unit to 10 units of structural units derived from isoprene and a trimethylene group are bonded.

$R^{12}$ and $R^{13}$ in the formula (1) represent a hydrocarbyl group optionally having a substituent, or a trihydrocarbylsilyl group, or $R^{12}$ and $R^{13}$ are bonded to represent a hydrocarbylene group optionally having, as a hetero atom, an atom selected from the group consisting of a silicon atom, a nitrogen atom and an oxygen atom.

The hydrocarbyl group optionally having a substituent is a hydrocarbyl group or a substituted hydrocarbyl group. Examples of the substituent in the substituted hydrocarbyl group include a substituted amino group or a hydrocarbyloxy group. Examples of the hydrocarbyl group include chain alkyl groups such as a methyl group, an ethyl group, a n-propyl group, an isopropyl group, a n-butyl group, an isobutyl group, a sec-butyl group, a tert-butyl group, a n-pentyl group, a n-hexyl group, a n-octyl group, and a n-dodecyl group; cyclic alkyl groups such as a cyclopentyl group and a cyclohexyl group; and aryl groups such as a phenyl group and a benzyl group, and preferably chain alkyl groups, and more preferably chain alkyl groups having 1 to 4 carbon atoms. Examples of the substituted hydrocarbyl group in which the substituent is a substituted amino group include an N,N-dimethylaminomethyl group, a 2-N,N-dimethylaminoethyl group, and a 3-N,N-dimethylaminopropyl group. Examples of the substituted hydrocarbyl group in which the substituent is a hydrocarbyloxy group include a methoxymethyl group, a methoxyethyl group, and an ethoxymethyl group. Among them, a hydrocarbyl group is preferable, a chain alkyl group having 1 to 4 carbon atoms is preferable, and a methyl group or an ethyl group is more preferable.

Examples of the trihydrocarbylsilyl group include a trimethylsilyl group, and a tert-butyl-dimethylsilyl group, and a trimethylsilyl group is preferable.

The hydrocarbylene group optionally having, as a hetero atom, at least one kind atom selected from the atomic group consisting of a silicon atom, a nitrogen atom and an oxygen atom is a hydrocarbylene group, or a hetero atom-containing hydrocarbylene group in which the hetero atom is at least one kind atom selected from the atomic group consisting of a silicon atom, a nitrogen atom and an oxygen atom. Examples of the hetero atom-containing hydrocarbylene group in which the hetero atom is at least one kind atom selected from the atomic group consisting of a silicon atom, a nitrogen atom and an oxygen atom include a hetero atom-containing hydrocarbylene group in which the hetero atom is a silicon atom, a hetero atom-containing hydrocarbylene group in which the hetero atom is a nitrogen atom, and a hetero atom-containing hydrocarbylene group in which the hetero atom is an oxygen atom. Examples of the hydrocarbylene group include alkylene groups such as a tetramethylene group, a pentamethylene group, a hexamethylene group, and a 2,2,4-trimethylhexane-1,6-diyl group; and alkenediyl groups such as a pent-2-ene-1,5-diyl group, and preferably alkylene groups, and more preferably alkylene groups having 4 to 7 carbon atoms. Examples of the hetero atom-containing hydrocarbylene group in which the hetero atom is a silicon atom include a group represented by $\text{—}Si(CH_3)_2\text{—}CH_2\text{—}CH_2\text{—}Si(CH_3)_2\text{—}$. Examples of the hetero atom-containing hydrocarbylene group in which the hetero atom is a nitrogen atom include a group represented by —CH═N—CH═CH— and a group represented by $\text{—}CH\text{═}N\text{—}CH_2\text{—}CH_2\text{—}$. Examples of the hetero atom-containing hydrocarbylene group in which the hetero atom is an oxygen atom include a group represented by $\text{—}CH_2\text{—}CH_2\text{—}O\text{—}CH_2\text{—}CH_2\text{—}$. Among them, a hydrocarbylene group is preferable, an alkylene group having 4 to 7 carbon atoms is more preferable, and a tetramethylene group, a pentamethylene group, and a hexamethylene group are further preferable.

It is preferable that $R^{12}$ and $R^{13}$ are a hydrocarbyl group, or $R^{12}$ and $R^{13}$ are bonded to form a hydrocarbylene group, it is more preferable that $R^{12}$ and $R^{13}$ are a chain alkyl group having 1 to 4 carbon atoms, or $R^{12}$ and $R^{13}$ are bonded to form an alkylene group having 4 to 7 carbon atoms, and it is further preferable that $R^{12}$ and $R^{13}$ are a chain alkyl group having 1 to 4 carbon atoms, and it is particularly preferable that $R^{12}$ and $R^{13}$ are a methyl group or an ethyl group.

In the formula (1), M represents an alkali metal atom. Examples of the alkali metal atom include Li, Na, K and Cs, and preferably Li.

Examples of the polymerization initiator represented by the formula (1) include a compound obtained by reacting an aminoalkyllithium compound with 1 mol to 5 mol (per 1 mol of an aminoalkyllithium compound) of isoprene. Examples of the aminoalkyllithium compound include N,N-dialkylaminoalkyllithiums such as 3-(N,N-dimethylamino)-1-propyllithium, 3-(N,N-diethylamino)-1-propyllithium, 3-(N,N-di-n-butylamino)-1-propyllithium, 4-(N,N-dimethylamino)-1-butyllithium, 4-(N,N-diethylamino)-1-butyllithium, 4-(N,N-di-n-propylamino)-1-butyllithium, and 3-(N,N-di-n-butylamino)-1-butyllithium; non hetero atom-containing cyclic aminoalkyllithium compounds such as 3(1-pyrrolidinyl)-1-propyllithium, 3-(1-piperidinyl)-1-propyllithium, 3-(1-hexamethyleneimino)-1-propyllithium, and 3-[1-(1,2,3,6-tetrahydropyridinyl)]-1-propyllithium; hetero atom-containing cyclic aminoalkyllithium compounds such as 3-(1-morpholino)-1-propyllithium, 3-(1-imidazolyl)-1-propyllithium, 3-(4,5-dihydro-1-imidazolyl)-1-propyllithium, and 3-(2,2,5,5-tetramethyl-1-aza-2,5-disila-1-cyclopentyl)-1-propyllithium, and preferably N,N-dialkylaminoalkyllithium, and more preferably 3-(N,N-dimethylamino)-1-propyllithium or 3-(N,N-diethylamino)-1-propyllithium.

As the polymerization initiator represented by the formula (1), a compound obtained by reacting N,N-dialkylaminoalkyllithium with 1 mol to 5 mol (per 1 mol of N,N-dialkylaminoalkyllithium) of isoprene is preferable, and a compound obtained by reacting 3-(N,N-dimethylamino)-1-propyllithium or 3-(N,N-diethylamino)-1-propyllithium with 1 mol to 5 mol (per 1 mol of 3-(N,N-dimethylamino)-1-propyllithium or 3-(N,N-diethylamino)-1-propyllithium) of isoprene is particularly preferable.

The amount of the polymerization initiator represented by the formula (1) used is preferably 0.01 mmol to 15 mmol per 100 g of the monomer component used in polymerization.

In the present invention, if necessary, other polymerization initiators such as n-butyllithium may be used in combination.

Examples of the conjugated diene compound include 1,3-butadiene, isoprene, 1,3-pentadiene, 2,3-dimethyl-1,3-butadiene, and 1,3-hexadiene, and preferably 1,3-butadiene or isoprene.

The silicon-containing vinyl compound is preferably a compound represented by the following formula (2).

(2)

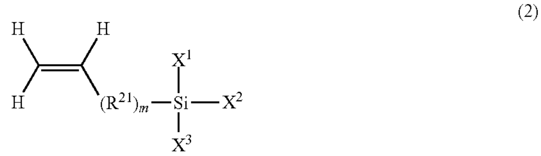

(wherein m is 0 or 1, $R^{21}$ represents a hydrocarbylene group, and $X^1$, $X^2$ and $X^3$ represent a substituted amino group, a hydrocarbyloxy group, or a hydrocarbyl group optionally having a substituent.)

In the formula (2), m is 0 or 1, and preferably 0.

Examples of the hydrocarbylene group in $R^{21}$ include an alkylene group, an alkenediyl group, an aryl group, and a group in which an arylene group and an alkylene group are bonded. Examples of the alkylene group include a methylene group, an ethylene group, and a trimethylene group. Examples of the alkenediyl group include a vinylene group and an ethylene-1,1-diyl group. Examples of the arylene group include a phenylene group, a naphthylene group, and a biphenylene group. Examples of the group in which an arylene group and an alkylene group are bonded include a group in which a phenylene group and a methylene group are bonded, and a group in which a phenylene group and an ethylene group are bonded.

$R^{21}$ is preferably an arylene group and more preferably a phenylene group.

In the formula (2), $X^1$, $X^2$ and $X^3$ represent a substituted amino group, a hydrocarbyloxy group, or a hydrocarbyl group optionally having a substituent. Preferably, at least one of $X^1$, $X^2$ and $X^3$ is a substituted amino group, and more preferably, two of $X^1$, $X^2$ and $X^3$ are a substituted amino group.

The substituted amino group in $X^1$, $X^2$ and $X^3$ is preferably a group represented by the following formula (2-A).

$$R^{22}R^{23}N- \quad (2\text{-}A)$$

($R^{22}$ and $R^{23}$ represent a hydrocarbyl group optionally having a substituent, or a trihydrocarbylsilyl group, or $R^{22}$ and $R^{23}$ are bonded to represent a hydrocarbylene group optionally having, as a hetero atom, a nitrogen atom and/or an oxygen atom.)

The hydrocarbyl group optionally having a substituent in $R^{22}$ and $R^{23}$ is a hydrocarbyl group or a substituted hydrocarbyl group. Examples of the substituted hydrocarbyl group include a substituted hydrocarbyl group in which the substituent is a hydrocarbyloxy group. Examples of the hydrocarbyl group include chain alkyl groups such as a methyl group, an ethyl group, a n-propyl group, an isopropyl group, a n-butyl group, an isobutyl group, a sec-butyl group, a tert-butyl group, a n-pentyl group, a n-hexyl group, and a n-octyl group; cyclic alkyl groups such as a cyclopentyl group and a cyclohexyl group; and aryl groups such as a phenyl group, a benzyl group, and a naphthyl group, and preferably an alkyl group, more preferably a chain alkyl group, and further preferably a methyl group, an ethyl group, a n-propyl group, and a n-butyl group. Examples of the substituted hydrocarbyl group in which the substituent is a hydrocarbyloxy group include alkoxyalkyl groups such as a methoxymethyl group, an ethoxymethyl group, and a methoxyethyl group; and aryloxyalkyl groups such as a phenoxymethyl group.

Examples of the trihydrocarbylsilyl group in $R^{22}$ and $R^{23}$ include trialkylsilyl groups such as a trimethylsilyl group, a triethylsilyl group, and a tert-butyldimethylsilyl group.

The hydrocarbylene group optionally having, as a hetero atom, a nitrogen atom and/or an oxygen atom in $R^{22}$ and $R^{23}$ is a hydrocarbylene group, or a hetero atom-containing hydrocarbylene group in which the hetero atom is a nitrogen atom and/or an oxygen atom. Examples of the hetero atom-containing hydrocarbylene group in which the hetero atom is a nitrogen atom and/or an oxygen atom include a hetero atom-containing hydrocarbylene group in which the hetero atom is a nitrogen atom, and a hetero atom-containing hydrocarbylene group in which the hetero atom is an oxygen atom. Examples of the hydrocarbylene group include alkylene groups such as a trimethylene group, a tetramethylene group, a pentamethylene group, a hexamethylene group, a heptamethylene group, an octamethylene group, a decamethylene group, a dodecamethylene group, and a 2,2,4-trimethylhexane-1,6-diyl group; and alkenediyl groups such as a pent-2-ene-1,5-diyl group. Examples of the hetero atom-containing hydrocarbylene group in which the hetero atom is a nitrogen atom include a group represented by $-CH=N-CH=CH-$ and a group represented by $-CH=N-CH_2-CH_2-$. Examples of the hetero atom-containing hydrocarbylene group in which the hetero atom is an oxygen atom include a group represented by $-CH_2-CH_2-O-CH_2-CH_2-$.

It is preferable that $R^{22}$ and $R^{23}$ are an alkyl group, or $R^{22}$ and $R^{23}$ are bonded to form an alkylene group, it is more preferable to form an alkyl group, and it is further preferable to form a methyl group or an ethyl group.

Examples of a substituted amino group in which $R^{22}$ and $R^{23}$ are a hydrocarbyl group, of the substituted amino groups represented by the formula (2-A), include dialkylamino groups such as a dimethylamino group, a diethylamino group, an ethylmethylamino group, a di-n-propylamino group, a diisopropylamino group, a di-n-butylamino group, a diisobutylamino group, a di-sec-butylamino group, and a di-tert-butylamino group; and diarylamino groups such as a diphenylamino group, and preferably a dialkylamino group, and more preferably a dimethylamino group, a diethylamino group, a di-n-propylamino group, and a di-n-butylamino group. Examples of the substituted amino group in which $R^{22}$ and $R^{23}$ are bonded to form a substituted hydrocarbyl group in which the substituent is a hydrocarbyloxy group include di(alkoxyalkyl)amino groups such as a di(methoxymethyl) amino group and a di(ethoxymethyl)amino group. Examples of the substituted amino group in which $R^{22}$ and $R^{23}$ are a trihydrocarbylsilyl group include trialkylsilyl group-containing amino groups such as a bis(trimethylsilyl)amino group, a bis(tert-butyldimethylsilyl)amino group, and a N-trimethylsilyl-N-methylamino group.

Examples of a substituted amino group in which $R^{22}$ and $R^{23}$ are bonded to form a hydrocarbylene group, of the substituted amino groups represented by the formula (2-A), include 1-alkyleneimino groups such as a 1-trimethyleneimino group, a 1-pyrrolidinyl group, a 1-piperidinyl group, a 1-hexamethyleneimino group, a 1-heptamethyleneimino group, a 1-octamethyleneimino group, a 1-decamethyleneimino group, and a 1-dodecamethyleneimino group. Examples of the substituted amino group in which $R^{22}$ and $R^{23}$ are bonded to form a hetero atom-containing hydrocarbyl group in which the hetero atom is a nitrogen atom include a 1-imidazolyl group and a 4,5-dihydro-1-imidazolyl group. Examples of the substituted amino group in which $R^{22}$ and $R^{23}$ are bonded to form a hetero atom-containing hydrocarbylene group in which the hetero atom is an oxygen atom include a morpholino group.

As the substituted amino group represented by the formula (2-A), a dialkylamino group or a 1-alkyleneimino group is preferable, a dialkylamino group is more preferable, and a dimethylamino group, a diethylamino group, a di-n-propylamino group, and a di-n-butylamino group are further preferable.

Examples of the hydrocarbyloxy group in $X^1$, $X^2$ and $X^3$ include alkoxy groups such as a methoxy group, an ethoxy group, a n-propoxy group, an isopropoxy group, a n-butoxy group, a sec-butoxy group, and a tert-butoxy group; and aryloxy groups such as a phenoxy group and a benzyloxy group.

The hydrocarbyl group optionally having a substituent in $X^1$, $X^2$ and $X^3$ is a hydrocarbyl group or a substituted hydrocarbyl group. Examples of the substituted hydrocarbyl group include a substituted hydrocarbyl group in which the substituent is a hydrocarbyloxy group. Examples of the hydrocarbyl group include alkyl groups such as a methyl group, an ethyl group, a n-propyl group, an isopropyl group, a n-butyl group, a sec-butyl group, and a tert-butyl group; and aryl groups such as a phenyl group, a 4-methyl-1-phenyl group, and a benzyl group. Examples of the substituted hydrocarbyl group in which the substituent is a hydrocarbyloxy group include alkoxyalkyl groups such as a methoxymethyl group, an ethoxymethyl group, and an ethoxyethyl group. Among them, an alkyl group is preferable, and an alkyl group having 1 to 10 carbon atoms is more preferable.

Examples of a compound in which one of $X^1$, $X^2$ and $X^3$ is a substituted amino group and m is 0, of the silicon-containing vinyl compounds represented by the formula (2), include:

(dialkylamino)dialkylvinylsilanes such as (dimethylamino)dimethylvinylsilane, (ethylmethylamino)dimethylvinylsilane, (di-n-propylamino)dimethylvinylsilane, (diisopropylamino)dimethylvinylsilane, (dimethylamino) diethylvinylsilane, (ethylmethylamino)diethylvinylsilane, (di-n-propylamino)diethylvinylsilane, and (diisopropylamino)diethylvinylsilane;

[bis(trialkylsilyl)amino]dialkylvinylsilanes such as [bis (trimethylsilyl)amino]dimethylvinylsilane, [bis(t-butyldimethylsilyl)amino]dimethylvinylsilane, [bis(trimethylsilyl) amino]diethylvinylsilane, and [bis(t-butyldimethylsilyl) amino]diethylvinylsilane;

(dialkylamino)di(alkoxyalkyl)vinylsilanes such as (dimethylamino)di(methoxymethyl)vinylsilane, (dimethylamino)di(2-methoxyethyl)vinylsilane, (dimethylamino)di (ethoxymethyl)vinylsilane, (dimethylamino)di(2-ethoxyethyl)vinylsilane, (diethylamino)di(methoxymethyl) vinylsilane, (diethylamino)di(2-methoxyethyl)vinylsilane, (diethylamino)di(ethoxymethyl)vinylsilane, and (diethylamino)di(2-ethoxyethyl)vinylsilane; and cyclic aminodialkylvinylsilane compounds such as 1-pyrrolidinyldimethylvinylsilane, 1-piperidinyldimethylvinylsilane, 1-hexamethyleneiminodimethylvinylsilane, 4,5-dihydro-1-imidazolyldimethylvinylsilane, and morpholinodimethylvinylsilane.

Examples of a compound in which one of $X^1$, $X^2$ and $X^3$ is a substituted amino group and m is 1, of the silicon-containing vinyl compounds represented by the formula (2), include:

(dialkylamino)dialkylvinylphenylsilanes such as (dimethylamino)dimethyl-4-vinylphenylsilane, (dimethylamino) dimethyl-3-vinylphenylsilane, (diethylamino)dimethyl-4-vinylphenylsilane, (diethylamino)dimethyl-3-vinylphenylsilane, (di-n-propylamino)dimethyl-4-vinylphenylsilane, (di-n-propylamino)dimethyl-3-vinylphenylsilane, (di-n-butylamino)dimethyl-4-vinylphenylsilane, (di-n-butylamino)dimethyl-3-vinylphenylsilane, (dimethylamino)diethyl-4-vinylphenylsilane, (dimethylamino)diethyl-3-vinylphenylsilane, (diethylamino)diethyl-4-vinylphenylsilane, (diethylamino)diethyl-3-vinylphenylsilane, (di-n-propylamino)diethyl-4-vinylphenylsilane, (di-n-propylamino)diethyl-3-vinylphenylsilane, (di-n-butylamino)diethyl-4-vinylphenylsilane, and (di-n-butylamino)diethyl-3-vinylphenylsilane.

Examples of a compound in which two of $X^1$, $X^2$ and $X^3$ are a substituted amino group and m is 0, of the silicon-containing vinyl compounds represented by the formula (2), include:

bis(dialkylamino)alkylvinylsilanes such as bis(dimethylamino)methylvinylsilane, bis(diethylamino)methylvinylsilane, bis(di-n-propylamino)methylvinylsilane, bis(di-n-butylamino)methylvinylsilane, bis(dimethylamino) ethylvinylsilane, bis(diethylamino)ethylvinylsilane, bis(di-n-propylamino)ethylvinylsilane, and bis(di-n-butylamino) ethylvinylsilane;

bis[bis(trialkylsilyl)amino]alkylvinylsilanes such as bis [bis(trimethylsilyl)amino]methylvinylsilane, bis[bis(tert-butyldimethyl)amino]methylvinylsilane, bis[bis(trimethylsilyl)amino]ethylvinylsilane, and bis[bis(tert-butyldimethyl) amino]ethylvinylsilane;

bis(dialkylamino)alkoxyalkylvinylsilanes such as bis (dimethylamino)methoxymethylvinylsilane, bis(dimethylamino)(2-methoxyethyl)vinylsilane, bis(dimethylamino)ethoxymethylvinylsilane, bis(dimethylamino)(2-ethoxyethyl)

vinylsilane, bis(diethylamino)methoxymethylvinylsilane, bis(diethylamino)(2-methoxyethyl)vinylsilane, bis(diethylamino)ethoxymethylvinylsilane, and bis(dimethylamino)(2-ethoxyethyl)vinylsilane; and bis(cyclic amino)alkylvinylsilane compounds such as bis(1-pyrrolidinyl)methylvinylsilane, bis(1-piperidinyl)methylvinylsilane, bis(1-hexamethyleneimino)methylvinylsilane, bis(4,5-dihydro-1-imidazolyl)methylvinylsilane, and bis(morpholino)methylvinylsilane.

Examples of a compound in which two of $X^1$, $X^2$ and $X^3$ are a substituted amino group and m is 1, of the silicon-containing vinyl compounds represented by the formula (2), include:

bis(dialkylamino)alkylvinylphenylsilanes such as bis(dimethylamino)methyl-4-vinylphenylsilane, bis(dimethylamino)methyl-3-vinylphenylsilane, bis(diethylamino)methyl-4-vinylphenylsilane, bis(diethylamino)methyl-3-vinylphenylsilane, bis(di-n-propylamino)methyl-4-vinylphenylsilane, bis(di-n-propylamino)methyl-3-vinylphenylsilane, bis(di-n-butylamino)methyl-4-vinylphenylsilane, bis(di-n-butylamino)methyl-3-vinylphenylsilane, bis(dimethylamino)ethyl-4-vinylphenylsilane, bis(dimethylamino)ethyl-3-vinylphenylsilane, bis(diethylamino)ethyl-4-vinylphenylsilane, bis(diethylamino)ethyl-3-vinylphenylsilane, bis(di-n-propylamino)ethyl-4-vinylphenylsilane, bis(di-n-propylamino)ethyl-3-vinylphenylsilane, bis(di-n-butylamino)ethyl-4-vinylphenylsilane, and bis(di-n-butylamino)ethyl-3-vinylphenylsilane.

Examples of a compound in which three of $X^1$, $X^2$ and $X^3$ are a substituted amino group and m is 0, of the silicon-containing vinyl compounds represented by the formula (2), include:

tris(dialkylamino)vinylsilanes such as tris(dimethylamino)vinylsilane, tris(diethylamino)vinylsilane, tris(di-n-propylamino)vinylsilane, and tris(di-n-butylamino)vinylsilane.

Examples of a compound in which three of $X^1$, $X^2$ and $X^3$ are a substituted amino group and m is 1, of the silicon-containing vinyl compounds represented by the formula (2), include:

tris(dialkylamino)vinylphenylsilanes such as tris(dimethylamino)-4-vinylphenylsilane, tris(dimethylamino)-3-vinylphenylsilane, tris(diethylamino)-4-vinylphenylsilane, tris(diethylamino)-3-vinylphenylsilane, tris(di-n-propylamino)-4-vinylphenylsilane, tris(di-n-propylamino)-3-vinylphenylsilane, tris(di-n-butylamino)-4-vinylphenylsilane, and tris(di-n-butylamino)-3-vinylphenylsilane.

Examples of a compound in which $X^1$, $X^2$ and $X^3$ are not a substituted amino group and m is 0, of the silicon-containing vinyl compounds represented by the formula (2), include:

trialkoxyvinylsilanes such as trimethoxyvinylsilane, triethoxyvinylsilane, and tripropoxyvinylsilane; dialkoxyalkylvinylsilanes such as methyldimethoxyvinylsilane and methyldiethoxyvinylsilane; dialkoxyarylvinylsilanes such as di(tert-pentoxy)phenylvinylsilane and di(tert-butoxy)phenylvinylsilane; monoalkoxydialkylvinylsilanes such as dimethylmethoxyvinylsilane; monoalkoxydiarylvinylsilanes such as tert-butoxydiphenylvinylsilane and tert-pentoxydiphenylvinylsilane; monoalkoxyalkylarylvinylsilanes such as tert-butoxymethylphenylvinylsilane and tert-butoxyethylphenylvinylsilane; and substituted alkoxyvinylsilane compounds such as tris(β-methoxyethoxy)vinylsilane.

Further, examples of the silicon-containing vinyl compound include bis(trialkylsilyl)-aminostyrenes such as 4-N,N-bis(trimethylsilyl)aminostyrene and 3-N,N-bis(trimethylsilyl)aminostyrene; and bis(trialkylsilyl)aminoalkylstyrenes such as 4-bis(trimethylsilyl)aminomethylstyrene, 3-bis(trimethylsilyl)aminomethylstyrene, 4-[2-bis(trimethylsilyl)aminoethyl]styrene, and 3-[2-bis(trimethylsilyl)aminoethyl]styrene.

The silicon-containing vinyl compound is preferably a compound represented by the formula (2), more preferably a compound in which m in the formula (2) is 0, further preferably a compound in which two of $X^1$, $X^2$ and $X^3$ in the formula (2) are a dialkylamino group, and particularly preferably a compound in which one of $X^1$, $X^2$ and $X^3$ in the formula (2) is an alkyl group.

A compound which is particularly preferable as the silicon-containing vinyl compound is bis(dimethylamino)methylvinylsilane, bis(diethylamino)methylvinylsilane, bis(di-n-propylamino)methylvinylsilane, or bis(di-n-butylamino)methylvinylsilane.

In addition, in a monomer unit based on the compound represented by the formula (2), a group represented by $X^1$, $X^2$ and $X^3$ may be a hydroxyl group through hydrolysis or the like.

In the present invention, in order to enhance fuel cost saving properties, the amount of the silicon-containing vinyl compound used is preferably 0.01 wt % or more, more preferably 0.02 wt % or more, and further preferably 0.05 wt % or more per 100 wt % of the total amount of monomer components used in polymerization. In order to enhance economical properties and to increase tensile strength at break, the amount used is preferably 20 wt % or less, more preferably 2 wt % or less, and further preferably 1 wt % or less.

In the present invention, in order to enhance tensile strength at break, it is preferable that polymerization is performed using an aromatic vinyl compound as a monomer component, in addition to the conjugated diene compound and the silicon-containing vinyl compound. Examples of the aromatic vinyl compound include styrene, α-methylstyrene, vinyltoluene, vinylnaphthalene, divinylbenzene, trivinylbenzene, and divinylnaphthalene, and preferably styrene.

The amount of the aromatic vinyl compound used is 0 wt % or more (the amount of the conjugated diene compound used is 100 wt % or less), preferably 10 wt % or more (the amount of the conjugated diene compound used is 90 wt % or less), and more preferably 15 wt % or more (the content of the conjugated diene compound is 85 wt % or less), per 100 wt % of the total amount of the conjugated diene compound and the aromatic vinyl compound. Further, in order to enhance fuel cost saving properties, the content of the aromatic vinyl compound is preferably 50 wt % or less (the content of the conjugated diene compound is 50 wt % or more), and more preferably 45 wt % or less (the content of the conjugated diene compound is 55 wt % or more).

In the present invention, it is preferable that polymerization is performed in a solution using a hydrocarbon as a solvent. The hydrocarbon is a compound that does not inactivate the polymerization initiator of the formula (1), and examples thereof include aliphatic hydrocarbons, aromatic hydrocarbons, and alicyclic hydrocarbons. Examples of the aliphatic hydrocarbon include propane, n-butane, iso-butane, n-pentane, iso-pentane, n-hexane, n-heptane, and n-octane. Examples of the aromatic hydrocarbon include benzene, toluene, xylene, and ethylbenzene. Examples of the alicyclic hydrocarbon include cyclopentane and cyclohexane. The hydrocarbon solvent may be a mixture of various components such as industrial hexane. It is preferably a hydrocarbon having 2 to 12 carbon atoms.

The polymerization reaction may be performed in the presence of an agent for adjusting the vinyl bonding amount in a conjugated diene unit, or an agent for adjusting distribution of a conjugated diene unit and a monomer unit based on a monomer other than conjugated diene in a conjugated diene-based polymer chain (hereinafter, collectively referred to as "adjusting agent"). Examples of the agent include ether compounds, tertiary amine compounds, and phosphine compounds. Examples of the ether compound include cyclic ethers such as tetrahydrofuran, tetrahydropyran, and 1,4-dioxane; aliphatic monoethers such as diethyl ether and dibutyl ether; aliphatic diethers such as ethylene glycol dimethyl ether, ethylene glycol diethyl ether, ethylene glycol dibutyl ether, diethylene glycol diethyl ether, and diethylene glycol dibutyl ether; and aromatic ethers such as diphenyl ether and anisole. Examples of the tertiary amine compound include triethylamine, tripropylamine, tributylamine, N,N,N',N'-tetramethylethylenediamine, N,N-diethylaniline, pyridine, and quinoline. Examples of the phosphine compound include trimethylphosphine, triethylphosphine, and triphenylphosphine. One or more kinds of them are used.

In the present invention, the polymerization initiator may be supplied to a polymerization reactor before the monomer components are supplied to the reaction reactor, or the polymerization initiator may be supplied to the polymerization reactor after the whole amount of monomer components used in polymerization are supplied to the polymerization reactor, or the polymerization initiator may be supplied to the polymerization reactor after a part of monomer components used in polymerization are supplied to the polymerization reactor. The polymerization initiator may be supplied at once or continuously to the polymerization reactor.

In the present invention, the polymer components may be supplied at once, or continuously, or intermittently to the polymerization reactor. Further, respective monomers may be supplied separately, or simultaneously to the polymerization reactor.

The polymerization temperature in the present invention is usually 25° C. to 100° C., preferably 35° C. to 90° C., and further preferably 50° C. to 80° C. The polymerization time is usually 10 minutes to 5 hours.

In the process for producing a conjugated diene-based polymer of the present invention, a compound containing a nitrogen atom and/or a silicon atom may be reacted with an active end of a polymer produced by polymerization.

Preferable examples of the compound containing a nitrogen atom and/or a silicon atom include compounds containing a nitrogen atom and a carbonyl group.

As the compound containing a nitrogen atom and a carbonyl group, a compound represented by the following formula (3) is preferable.

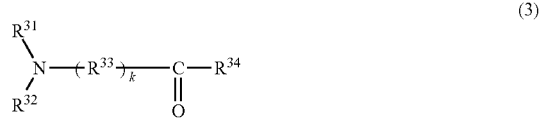

(3)

(wherein, $R^{31}$ and $R^{32}$ may be bonded, or $R^{31}$ and $R^{34}$ may be bonded, $R^{31}$ represents a hydrocarbyl group optionally having a substituent, or is bonded with $R^{32}$ to represent a hydrocarbylene group optionally having, as a hetero atom, a nitrogen atom and/or an oxygen atom, or is bonded with $R^{34}$ to represent a divalent group, $R^{32}$ represents a hydrocarbyl group optionally having a substituent, or is bonded with $R^{31}$ to represent a hydrocarbylene group optionally having, as a hetero atom, a nitrogen atom and/or an oxygen atom, and $R^{34}$ represents a hydrocarbyl group optionally having a substituent, or a hydrogen atom, or is bonded with $R^{31}$ to represent a divalent group. $R^{33}$ represents a divalent group, and k represents 0 or 1.)

In the formula (3), the hydrocarbyl group optionally having a substituent in $R^{31}$, $R^{32}$ and $R^{34}$ is a hydrocarbyl group or a substituted hydrocarbyl group. Examples of the substituted hydrocarbyl group include a substituted hydrocarbyl group in which the substituent is a hydrocarbyloxy group, and a substituted hydrocarbyl group in which the substituent is a substituted amino group. Examples of the hydrocarbyl group include alkyl groups such as a methyl group, an ethyl group, a n-propyl group, an isopropyl group, and a n-butyl group; alkenyl groups such as a vinyl group, an allyl group, and an isopropenyl group; and aryl groups such as a phenyl group. Examples of the substituted hydrocarbyl group in which the substituent is a hydrocarbyloxy group include alkoxyalkyl groups such as a methoxymethyl group, an ethoxymethyl group, and an ethoxyethyl group. Examples of the substituted hydrocarbyl group in which the substituent is a substituted amino group include (N,N-dialkylamino)alkyl groups such as a 2-(N,N-dimethylamino)ethyl group, a 2-(N,N-diethylamino)ethyl group, a 3-(N,N-dimethylamino)propyl group, and a 3-(N,N-diethylamino)propyl group; (N,N-dialkylamino)aryl groups such as a 4-(N,N-dimethylamino)phenyl group, a 3-(N,N-dimethylamino)phenyl group, a 4-(N,N-diethylamino)phenyl group, and a 3-(N,N-diethylamino)phenyl group; (N,N-dialkylamino)alkylaryl groups such as a 4-(N,N-dimethylamino)methylphenyl group and a 4-[2-(N,N-dimethylamino)ethyl]phenyl group; cyclic amino group-containing alkyl groups such as a 3-(1-pyrrolidinyl)propyl group, a 3-(1-piperidinyl)propyl group, and a 3-(1-imidazolyl)propyl group; cyclic amino group-containing aryl groups such as a 4-(1-pyrrolidinyl)phenyl group, a 4-(1-piperidinyl)phenyl group, and a 4-(1-imidazolyl)phenyl group; and cyclic amino group-containing alkylaryl groups such as a 4-[2-(1-pyrrolidinyl)ethyl]phenyl group, a 4-[2-(1-piperidinyl)ethyl]phenyl group, and a 4-[2-(1-imidazolyl)ethyl]phenyl group.

In the formula (3), the hydrocarbylene group optionally having, as a hetero atom, a nitrogen atom and/or an oxygen atom, formed by bonding of $R^{31}$ and $R^{32}$, is a hydrocarbylene group or a hetero atom-containing hydrocarbylene group in which the hetero atom is a nitrogen atom and/or an oxygen atom. Examples of the hetero atom-containing hydrocarbylene group in which the hetero atom is a nitrogen atom and/or an oxygen atom include a hetero atom-containing hydrocarbylene group in which the hetero atom is a nitrogen atom and a hetero atom-containing hydrocarbylene group in which the hetero atom is an oxygen atom. Examples of the hydrocarbylene group include alkylene groups such as a trimethylene group, a tetramethylene group, a pentamethylene group, a hexamethylene group, and a 2,2,4-trimethylhexane-1,6-diyl group; and arylene groups such as a 1,4-phenylene group. Examples of the hetero atom-containing hydrocarbylene group in which the hetero atom is a nitrogen atom include a group represented by —CH=N—CH=CH— and a group represented by $—CH=N—CH_2—CH_2—$. Examples of the hetero atom-containing hydrocarbylene group in which the hetero atom is an oxygen atom include a group represented by $—(CH_2)_s—O—(CH_2)_t—$ (s and t are an integer of 1 or more).

In the formula (3), examples of the divalent group formed by bonding of $R^{31}$ and $R^{34}$, and the divalent group of $R^{33}$ include a hydrocarbylene group, a hetero atom-containing hydrocarbylene group in which the hetero atom is a nitrogen atom, a hetero atom-containing hydrocarbylene group in which the hetero atom is an oxygen atom, a group in which a hydrocarbylene group and an oxygen atom are bonded, and a group in which a hydrocarbylene group and a group represented by —$NR^{35}$— ($R^{35}$ represents a hydrocarbyl group or a hydrogen atom) are bonded. Examples of the hydrocarbylene group include alkylene groups such as a trimethylene group, a tetramethylene group, a pentamethylene group, a hexamethylene group, and a 2,2,4-trimethylhexane-1,6-diyl group; and arylene groups such as a 1,4-phenylene group. Examples of the hetero atom-containing hydrocarbylene group in which the hetero atom is a nitrogen atom include a group represented by —CH═N—CH═CH— and a group represented by —CH═N—$CH_2$—$CH_2$—. Examples of the hetero atom-containing hydrocarbylene group in which the hetero atom is an oxygen atom include a group represented by —$(CH_2)_s$—O—$(CH_2)_t$— (s and t are an integer of 1 or more). Examples of the group in which a hydrocarbylene group and an oxygen atom are bonded include a group represented by —$(CH_2)_r$—O— (r represents an integer of 1 or more). Examples of the group in which a hydrocarbylene group and a group represented by —$NR^{35}$— ($R^{35}$ represents a hydrocarbyl group or a nitrogen atom) are bonded include a group represented by —$(CH_2)_p$—$NR^{35}$— ($R^{35}$ represents a hydrocarbyl group having 1 to 6 carbon atoms, or a hydrogen atom, and p represents an integer of 1 or more).

Examples of a preferable compound represented by the formula (3) include a compound represented by (3-A) in which k is 0 and $R^{34}$ is a hydrocarbyl group optionally having a substituent or a hydrogen atom.

(3-A)

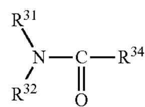

(wherein, $R^{31}$ and $R^{32}$ may be bonded, $R^{31}$ represents a hydrocarbyl group optionally having a substituent, or is bonded with $R^{32}$ to represent a hydrocarbylene group optionally having, as a hetero atom, a nitrogen atom and/or an oxygen atom, $R^{32}$ represents a hydrocarbyl group optionally having a substituent, or is bonded with $R^{31}$ to represent a hydrocarbylene group optionally having, as a hetero atom, a nitrogen atom and/or an oxygen atom, and $R^{34}$ represents a hydrocarbyl group optionally having a substituent or a hydrogen atom.)

In the formula (3-A), description and exemplification of the hydrocarbyl group optionally having a substituent in $R^{31}$, $R^{32}$ and $R^{34}$, and the hydrocarbylene group optionally having, as a hetero atom, a nitrogen atom and/or an oxygen atom, formed by bonding of $R^{31}$ and $R^{32}$, are the same as those stated in the description of the formula (3).

In the formula (3-A), $R^{31}$ is preferably a hydrocarbyl group having 1 to 10 carbon atoms, or is bonded with $R^{32}$ to form a hydrocarbylene group having 3 to 10 carbon atoms or a hetero atom-containing hydrocarbylene group having 3 to 10 carbon atoms in which the hetero atom is a nitrogen atom. $R^{31}$ is more preferably an alkyl group having 1 to 10 carbon atoms or an aryl group having 6 to 10 carbon atoms, or is bonded with $R^{32}$ to form an alkylene group having 3 to 10 carbon atoms, a group represented by —CH═N—CH═CH—, or a group represented by —CH═N—$CH_2$—$CH_2$—. $R^{31}$ is further preferably an alkyl group having 1 to 6 carbon atoms. $R^{31}$ is particularly preferably a methyl group or an ethyl group.

In the formula (3-A), $R^{32}$ is preferably a hydrocarbyl group having 1 to 10 carbon atoms, or is bonded with $R^{31}$ to form a hydrocarbylene group having 3 to 10 carbon atoms or a hetero atom-containing hydrocarbylene group having 3 to 10 carbon atoms in which the hetero atom is a nitrogen atom. $R^{32}$ is more preferably an alkyl group having 1 to 10 carbon atoms or an aryl group having 6 to 10 carbon atoms, or is bonded with $R^{31}$ to form an alkylene group having 3 to 10 carbon atoms, a group represented by —CH═N—CH═CH—, or a group represented by —CH═N—$CH_2$—$CH_2$—. $R^{32}$ is further preferably an alkyl group having 1 to 6 carbon atoms. $R^{32}$ is particularly preferably a methyl group or an ethyl group.

In the formula (3-A), $R^{34}$ is preferably a hydrocarbyl group or a hydrogen atom, more preferably a hydrocarbyl group having 1 to 10 carbon atoms or a hydrogen atom, further preferably an alkyl group having 1 to 6 carbon atoms or a hydrogen atom, and particularly preferably a hydrogen atom, a methyl group or an ethyl group.

Examples of a compound in which $R^{34}$ is a hydrocarbyl group, of the compounds represented by the formula (3-A), include N,N-dihydrocarbylacetamides such as N,N-dimethylacetamide, N,N-diethylacetamide, and N-methyl-N-ethylacetamide; N,N-dihydrocarbylacrylamides such as N-dimethylacrylamide, N,N-diethylacrylamide, and N-methyl-N-ethylacrylamide; and N,N-dihydrocarbylmethacrylamides such as N,N-dimethylmethacrylamide, N,N-diethylmethacrylamide, and N-methyl-N-ethylmethacrylamide.

Examples of a compound in which $R^{34}$ is a hydrogen atom, of the compounds represented by the formula (3-A), include N,N-dihydrocarbylformamides such as N,N-dimethylformamide, N,N-diethylformamide, and N-methyl-N-ethylformamide.

Examples of a preferable compound represented by the formula (3) include a compound represented by (3-B) in which k is 0 and $R^{34}$ is bonded with $R^{31}$ to form a divalent group.

(3-B)

(wherein, $R^{32}$ represents a hydrocarbyl group optionally having a substituent, $R^{36}$ represents a group in which a hydrocarbylene group and a group represented by —$NR^{35}$— are bonded, or a hydrocarbylene group, wherein $R^{35}$ represents a hydrocarbyl group or a hydrogen atom. A nitrogen atom to which $R^{35}$ is bonded is bonded with a carbon atom of C═O.)

In the formula (3-B), explanation and exemplification of a hydrocarbyl group optionally having a substituent of $R^{32}$ are the same as those stated in explanation of the formula (3).

In the formula (3-B), examples of the hydrocarbylene group in $R^{36}$ include alkylene groups such as a trimethylene group, a tetramethylene group, a pentamethylene group, a hexamethylene group, and a 2,2,4-trimethylhexane-1,6-diyl group; and arylene groups such as a 1,4-phenylene group. Examples of the group in which a hydrocarbylene group and a group represented by —$NR^{35}$— ($R^{35}$ represents a hydrocarbyl group or a hydrogen atom) are bonded in $R^{36}$ include a group represented by —$(CH_2)_p$—$NR^{35}$— ($R^{35}$ represents a hydrocarbyl group or a hydrogen atom, and p represents an integer of 1 or more).

In the formula (3-B), $R^{32}$ is preferably a hydrocarbyl group having 1 to 10 carbon atoms, more preferably an alkyl group having 1 to 10 carbon atoms or an aryl group having 6 to 10 carbon atoms, further preferably an alkyl group having 1 to 6 carbon atoms or a phenyl group, particularly preferably a methyl group, an ethyl group, or a phenyl group.

In the formula (3-B), $R^{36}$ is preferably a hydrocarbylene group having 1 to 10 carbon atoms, or a group in which a hydrocarbylene group having 1 to 10 carbon atoms and a group represented by —$NR^{35}$— ($R^{35}$ represents a hydrocarbyl group having 1 to 10 carbon atoms or a hydrogen atom) are bonded, more preferably an alkylene group having 3 to 6 carbon atoms or a group represented by —$(CH_2)_p$—$NR^{35}$— ($R^{35}$ represents a hydrocarbyl group having 1 to 10 carbon atoms, and p represents an integer of 2 to 5), and further preferably a trimethylene group, a tetramethylene group, a pentamethylene group, or a group represented by —$(CH_2)_2$—$N(CH_3)$—.

Examples of a compound in which $R^{36}$ is a hydrocarbylene group, of the compounds represented by the formula (3-B), include N-hydrocarbyl-β-propiolactams such as N-methyl-β-propiolactam and N-phenyl-β-propiolactam; N-hydrocarbyl-2-pyrrolidones such as N-methyl-2-pyrrolidone, N-vinyl-2-pyrrolidone, N-phenyl-2-pyrrolidone, N-tert-butyl-2-pyrrolidone, and N-methyl-5-methyl-2-pyrrolidone; N-hydrocarbyl-2-piperidones such as N-methyl-2-piperidone, N-vinyl-2-piperidone, and N-phenyl-2-piperidone; N-hydrocarbyl-ϵ-caprolactams such as N-methyl-ϵ-caprolactam and N-phenyl-ϵ-caprolactam; N-hydrocarbyl-ω-laurilolactams such as N-methyl-ω-laurilolactam and N-vinyl-ω-laurilolactam. The compound is preferably a compound in which $R^{36}$ is an alkylene group having 3 to 6 carbon atoms and $R^{32}$ is an alkyl group having 1 to 6 carbon atoms or a phenyl group, more preferably a compound in which $R^{36}$ is a trimethylene group, a tetramethylene group, or a pentamethylene group, and $R^{32}$ is a methyl group, an ethyl group, or a phenyl group, and further preferably N-phenyl-2-pyrrolidone, or N-methyl-ϵ-caprolactam.

Examples of a compound in which $R^{36}$ is a group in which a hydrocarbylene group and a group represented by —$NR^{35}$— ($R^{35}$ is a hydrocarbyl group or a hydrogen atom) are bonded, of the compounds represented by the formula (3-B), include 1,3-dihydrocarbyl-2-imidazolidinones such as 1,3-dimethyl-2-imidazolidinone, 1,3-diethyl-2-imidazolidinone, 1,3-divinyl-2-imidazolidinone, and 1-methyl-3-ethyl-2-imidazolidinone. The compound is preferably a compound in which $R^{36}$ is a group represented by —$(CH_2)_p$—$NR^{35}$— ($R^{35}$ is a hydrocarbyl group having 1 to 10 carbon atoms, and p represents an integer of 2 to 5) and $R^{32}$ is an alkyl group having 1 to 6 carbon atoms or a phenyl group, more preferably a compound in which $R^{36}$ is a group represented by —$(CH_2)_2$—$N(CH_3)$— and $R^{32}$ is a methyl group or an ethyl group, and further preferably 1,3-dimethyl-2-imidazolidinone.

Examples of a preferably compound represented by the formula (3) include a compound represented by the following formula (3-C) in which k is 1 and $R^{33}$ is a hydrocarbylene group.

(3-C)

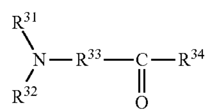

(wherein, $R^{31}$ and $R^{32}$ may be bonded, $R^{31}$ represents a hydrocarbyl group optionally having a substituent, or is bonded with $R^{32}$ to represent a hydrocarbylene group optionally having, as a hetero atom, a nitrogen atom and/or an oxygen atom, $R^{32}$ represents a hydrocarbyl group optionally having a substituent, or is bonded with $R^{31}$ to represent a hydrocarbylene group optionally having, as a hetero atom, a nitrogen atom and/or an oxygen atom, $R^{33}$ represents a hydrocarbylene group, and $R^{34}$ represents a hydrocarbyl group optionally having a substituent.)

In the formula (3-C), description and exemplification of the hydrocarbyl group optionally having a substituent in $R^{31}$, $R^{32}$ and $R^{34}$, the hydrocarbylene group optionally having, as a hetero atom, a nitrogen atom and/or an oxygen atom, formed by bonding of $R^{31}$ and $R^{32}$, and the hydrocarbylene group in $R^{33}$ are the same as those stated in the description of the formula (3).

In the formula (3-C), $R^{33}$ is preferably a hydrocarbylene group having 1 to 10 carbon atoms, more preferably an alkylene group having 1 to 10 carbon atoms or an arylene group having 6 to 10 carbon atoms, further preferably an alkylene group having 1 to 6 carbon atoms or a phenylene group, and particularly preferably an ethylene group, a trimethylene group, or a 1,4-phenylene group.

In the formula (3-C), $R^{34}$ is preferably a hydrocarbyl group having 1 to 10 carbon atoms, or a substituted hydrocarbyl group having 3 to 10 carbon atoms in which the substituent is a dialkylamino group, more preferably an alkyl group having 1 to 6 carbon atoms, an aryl group having 6 to 10 carbon atoms, a dialkylaminoalkyl group having 3 to 6 carbon atoms or a dialkylaminoaryl group having 8 to 10 carbon atoms, and further preferably a methyl group, an ethyl group, a dialkylaminomethyl group having 3 to 6 carbon atoms, a dialkylaminoethyl group having 4 to 6 carbon atoms, a phenyl group, or a dialkylaminophenyl group having 8 to 10 carbon atoms.

In the formula (3-C), $R^{31}$ is preferably a hydrocarbyl group having 1 to 10 carbon atoms, or is bonded with $R^{32}$ to form a hydrocarbylene group having 3 to 10 carbon atoms, or a hetero atom-containing hydrocarbylene group having 3 to 10 carbon atoms in which the hetero atom is a nitrogen atom, more preferably an alkyl group having 1 to 10 carbon atoms or an aryl group having 6 to 10 carbon atoms, or is bonded with $R^{32}$ to form an alkylene group having 3 to 10 carbon atoms, a group represented by —CH═N—CH═CH—, a group represented by —CH═N—$CH_2$—$CH_2$—, or a group represented by —$(CH_2)_2$—O—$(CH_2)_2$—, further preferably an alkyl group having 1 to 6 carbon atoms, or is bonded with $R^{32}$ to form an alkylene group having 3 to 6 carbon atoms, a group represented by —CH═N—CH═CH—, or a group represented by —CH═N—$CH_2$—$CH_2$—, and particularly preferably a methyl group or an ethyl group, or is bonded with $R^{32}$ to form a tetramethylene group, a hexamethylene group, or a group represented by —CH═N—CH═CH—.

In the formula (3-C), $R^{32}$ is preferably a hydrocarbyl group having 1 to 10 carbon atoms, or is bonded with $R^{31}$ to form a hydrocarbylene group having 3 to 10 carbon atoms, or a hetero atom-containing hydrocarbylene group having 3 to 10 carbon atoms in which the hetero atom is a nitrogen atom, more preferably an alkyl group having 1 to 10 carbon atoms or an aryl group having 6 to 10 carbon atoms, or is bonded with $R^{31}$ to form an alkylene group having 3 to 10 carbon atoms, a group represented by —CH═N—CH═CH—, a group represented by —CH═N—$CH_2$—$CH_2$—, or a group represented by —$(CH_2)_2$—O—$(CH_2)_2$—, further preferably an alkyl group having 1 to 6 carbon atoms, or is bonded with $R^{31}$ to form an alkylene group having 3 to 6 carbon atoms, a group represented by —CH═N—CH═CH—, or a group represented by —CH═N—$CH_2$—$CH_2$—, and particularly preferably a methyl group or an ethyl group, or is bonded with $R^{31}$ to form a tetramethylene group, a hexamethylene group, or a group represented by —CH═N—CH═CH—.

Examples of a compound in which $R^{33}$ is an arylene group and $R^{34}$ is an alkyl group, of the compounds represented by the formula (3-C), include 4-(N,N-dihydrocarbylamino)acetophenones such as 4-(N,N-dimethylamino)acetophenone, 4-(N-methyl-N-ethylamino)acetophenone, and 4-(N,N-diethylamino)acetophenone; 4-cyclic amino acetophenone compounds such as 4'-(imidazol-1-yl)acetophenone. Among them, a 4-cyclic amino acetophenone compound is preferable, and 4'-(imidazol-1-yl)acetophenone is more preferable.

Examples of a compound in which $R^{33}$ is an arylene group and $R^{34}$ is an aryl group or a substituted aryl group, of the compounds represented by the formula (3-C), include bis(dihydrocarbylaminoalkyl)ketones such as 1,7-bis(methylethylamino)-4-heptanone and 1,3-bis(diphenylamino)-2-propanone; 4-(dihydrocarbylamino)benzophenones such as 4-N,N-dimethylaminobenzophenone, 4-N,N-diethylaminobenzophenone, 4-N,N-di-t-butylaminobenzophenone, and 4-N,N-diphenylaminobenzophenone; and 4,4'-bis(dihydrocarbylamino)benzphenones such as 4,4'-bis(dimethylamino)benzophenone, 4,4'-bis(diethylamino)benzophenone, and 4,4'-bis(diphenylamino)benzophenone. Among them, a compound in which $R^{31}$ and $R^{32}$ are an alkyl group having 1 to 6 carbon atoms, $R^{33}$ is a phenylene group, and $R^{34}$ is a phenyl group or a dialkylaminophenyl group having 8 to 10 carbon atoms is preferable, and 4-N,N-dimethylaminobenzophenone, 4-N,N-diethylaminobenzophenone, 4,4'-bis(dimethylamino)benzophenone, and 4,4'-bis(diethylamino)benzophenone are more preferable.

Examples of a preferable compound represented by the formula (3) include a compound represented by the following formula (3-D) in which k is 1 and $R^{33}$ is a group in which a hydrocarbylene group and an oxygen atom are bonded, or a group in which a hydrocarbylene group and a group represented by —$NR^{35}$— ($R^{35}$ represents a hydrocarbyl group or a hydrogen atom) are bonded.

(3-D)

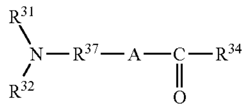

(wherein, $R^{31}$ and $R^{32}$ may be bonded, $R^{31}$ represents a hydrocarbyl group optionally having a substituent, or is bonded with $R^{32}$ to represent a hydrocarbylene group optionally having, as a hetero atom, a nitrogen atom and/or an oxygen atom, $R^{32}$ represents a hydrocarbyl group optionally having a substituent, or is bonded with $R^{31}$ to represent a hydrocarbylene group optionally having, as a hetero atom, a nitrogen atom and/or an oxygen atom, $R^{37}$ represents a hydrocarbylene group, A represents an oxygen atom or —$NR^{35}$—, $R^{35}$ represents a hydrocarbylene group or a hydrogen atom, and $R^{34}$ represents a hydrocarbyl group optionally having a substituent.)

In the formula (3-D), description and exemplification of the hydrocarbyl group optionally having a sub stituent in $R^{31}$, $R^{33}$ and $R^{34}$, and the hydrocarbylene group optionally having, as a hetero atom, a nitrogen atom and/or an oxygen atom, formed by bonding of $R^{31}$ and $R^{32}$, are the same as those stated in the description of the formula (3).

In the formula (3-D), A is preferably an oxygen atom or a group represented by —$NR^{35}$— ($R^{35}$ is a hydrocarbylene group having 1 to 5 carbon atoms or a hydrogen atom), more preferably an oxygen atom or a group represented by —NH—, and further preferably a group represented by —NH—.

In the formula (3-D), examples of the hydrocarbylene group in $R^{37}$ include alkylene groups such as a trimethylene group, a tetramethylene group, a pentamethylene group, a hexamethylene group, and a 2,2,4-trimethylhexane-1,6-diyl group; arylene groups such as a 1,4-phenylene group.

In the formula (3-D), $R^{34}$ is preferably a hydrocarbyl group having 1 to 10 carbon atoms, more preferably an alkenyl group having 2 to 5 carbon atoms, further preferably a vinyl group or an isopropenyl group, and particularly preferably a vinyl group.

In the formula (3-D), $R^{37}$ is preferably a hydrocarbylene group having 1 to 10 carbon atoms, more preferably an alkylene group having 1 to 6 carbon atoms, further preferably an ethylene group or a trimethylene group, and particularly preferably a trimethylene group.

In the formula (3-D), $R^{31}$ is preferably a hydrocarbyl group having 1 to 10 carbon atoms, or is bonded with $R^{32}$ to form a hydrocarbylene group having 3 to 10 carbon atoms, or a hetero atom-containing hydrocarbylene group having 3 to 10 carbon atoms in which the hetero atom is a nitrogen atom, more preferably an alkyl group having 1 to 10 carbon atoms or an aryl group having 6 to 10 carbon atoms, or is bonded with $R^{32}$ to form an alkylene group having 3 to 10 carbon atoms, a group represented by —CH═N—CH═CH—, a group represented by —CH═N—$CH_2$—$CH_2$—, or a group represented by —$(CH_2)_2$—O—$(CH_2)_2$—, further preferably an alkyl group having 1 to 6 carbon atoms, or is bonded with $R^{32}$ to form an alkylene group having 3 to 6 carbon atoms, a group represented by —CH═N—CH═CH—, or a group represented by —CH═N—$CH_2$—$CH_2$—, and particularly preferably a methyl group or an ethyl group, or is bonded with $R^{32}$ to form a tetramethylene group, a hexamethylene group, or a group represented by —CH═N—CH═CH—.

In the formula (3-D), $R^{32}$ is preferably a hydrocarbyl group having 1 to 10 carbon atoms, or is bonded with $R^{31}$ to form a hydrocarbylene group having 3 to 10 carbon atoms, or a hetero atom-containing hydrocarbylene group having 3 to 10 carbon atoms in which the hetero atom is a nitrogen atom, more preferably an alkyl group having 1 to 10 carbon atoms or an aryl group having 6 to 10 carbon atoms, or is bonded with $R^{31}$ to form an alkylene group having 3 to 10 carbon atoms, a group represented by —CH═N—CH═CH—, a group represented by —CH═N—$CH_2$—$CH_2$—, or a group represented by —$(CH_2)_2$—O—$(CH_2)_2$—, further preferably an alkyl group having 1 to 6 carbon atoms, or is bonded with $R^{31}$ to form an alkylene group having 3 to 6 carbon atoms, a group represented by —CH═N—CH═CH—, or a group represented by —CH═N—$CH_2$—$CH_2$—, and particularly preferably a methyl group or an ethyl group, or is bonded with $R^{31}$ to form a tetramethylene group, a hexamethylene group, or a group represented by —CH═N—CH═CH—.

Examples of a compound in which A is an oxygen atom, of the compounds represented by the formula (3-D), include:

2-(dihydrocarbylamino)ethyl acrylates such as 2-(dimethylamino)ethyl acrylate and 2-(diethylamino)ethyl acrylate; 3-(dihydrocarbylamino)propyl acrylates such as 3-(dimethylamino)propyl acrylate; 2-(dihydrocarbylamino)ethyl methacrylates such as 2-(dimethylamino)ethyl methacrylate and 2-(diethylamino)ethyl methacrylate; 3-(dihydrocarbylamino)propyl methacrylates such as 3-(dimethylamino)propyl methacrylate. As the compound in which A is an oxygen atom, a compound in which $R^{31}$ and $R^{32}$ are an alkyl group having 1 to 6 carbon atoms, $R^{34}$ is a vinyl group or an isopropenyl group, and $R^{37}$ is an ethylene group or a trimethylene group is preferable, and a compound in which $R^{31}$ and $R^{32}$ are a methyl group or an ethyl group, $R^{34}$ is a vinyl group, and $R^{37}$ is a trimethylene group is more preferable.

Examples of a compound in which A is a group represented by —NR$^{35}$—(R$^{35}$ is a hydrocarbylene group or a hydrogen atom), of the compounds represented by the formula (3-D), include:

N-(2-dihydrocarbylaminoethyl)acrylamides such as N-(2-dimethylaminoethyl)acrylamide and N-(2-diethylaminoethyl)acrylamide; N-(3-dihydrocarbylaminopropyl)acrylamides such as N-(3-dimethylaminopropyl)acrylamide and N-(3-diethylaminopropyl)acrylamide; N-(4-dihydrocarbylaminobutyl)acrylamides such as N-(4-dimethylaminobutyl)acrylamide and N-(4-diethylaminobutyl)acrylamide; N-(2-dihydrocarbylaminoethyl)methacrylamides such as N-(2-dimethylaminoethyl)methacrylamide and N-(2-diethylaminoethyl)methacrylamide; N-(3-dihydrocarbylaminopropyl)methacrylamides such as N-(3-dimethylaminopropyl)methacrylamide and N-(3-diethylaminopropyl)methacrylamide; N-(4-dihydrocarbylaminobutyl)methacrylamides such as N-(4-dimethylaminobutyl)methacrylamide and N-(4-diethylaminobutyl)methacrylamide. Among them, a compound in which A is a group represented by —NH—, R$^{31}$ and R$^{32}$ are an alkyl group having 1 to 6 carbon atoms, R$^{34}$ is a vinyl group or an isopropenyl group, and R$^{37}$ is an ethylene group or a trimethylene group is preferable, and a compound in which A is a group represented by —NH—, R$^{31}$ and R$^{32}$ are a methyl group or a methyl group, R$^{34}$ is a vinyl group, and R$^{37}$ is a trimethylene group is more preferable.

In addition to those described above, preferable examples of a compound containing a nitrogen atom and/or a silicon atom include a compound containing an alkoxysilyl group.

As the compound containing an alkoxysilyl group, a compound containing a nitrogen atom and an alkoxysilyl group is preferable, and examples of the compound include compounds represented by the following formula (4).

(4)

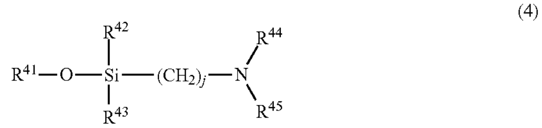

(wherein, R$^{44}$ and R$^{45}$ may be bonded, R$^{41}$ represents a hydrocarbyl group, R$^{42}$ and R$^{43}$ represent a hydrocarbyl group or a hydrocarbyloxy group, R$^{44}$ represents a hydrocarbyl group optionally having a substituent or a trihydrocarbylsilyl group, or is bonded with R$^{45}$ to represent a hydrocarbylene group optionally having, as a hetero atom, at least one kind atom selected from the atomic group consisting of a silicon atom, a nitrogen atom and an oxygen atom, R$^{45}$ represents a hydrocarbyl group optionally having a substituent or a trihydrocarbylsilyl group, or is bonded with R$^{44}$ to represent a hydrocarbylene group optionally having, as a hetero atom, at least one kind atom selected from the atomic group consisting of a silicon atom, a nitrogen atom and an oxygen atom, and j represents an integer of 1 to 5.)

In the formula (4), the hydrocarbyl group optionally having a substituent is a hydrocarbyl group or a substituted hydrocarbyl group.

In the formula (4), examples of the hydrocarbyl group include alkyl groups such as a methyl group, an ethyl group, a n-propyl group, an isopropyl group, and a n-butyl group; alkenyl groups such as a vinyl group, an allyl group, and an isopropenyl group; aryl groups such as a phenyl group, and preferably an alkyl group, and more preferably a methyl or an ethyl group. Examples of the substituted hydrocarbyl group include oxacycloalkyl groups such as an oxiranyl group and a tetrahydrofuranyl group, and preferably a tetrahydrofuranyl group.

Herein, the oxacycloalkyl group represents a group in which $CH_2$ on an alicycle of a cycloalkyl group is replaced with an oxygen atom.

Examples of the hydrocarbyloxy group include alkoxy groups such as a methoxy group, an ethoxy group, a n-propoxy group, an isopropoxy group, a n-butoxy group, a sec-butoxy group, and a tert-butoxy group; and aryloxy groups such as a phenoxy group and a benzyloxy group, and preferably an alkoxy group, and more preferably a methoxy group or an ethoxy group.

Examples of the trihydrocarbylsilyl group include a trimethylsilyl group and a tert-butyl-dimethylsilyl group, and preferably a trimethylsilyl group.

The hydrocarbylene group optionally having, as a hetero atom, at least one kind atom selected from the atomic group consisting of a silicon atom, a nitrogen atom and an oxygen atom is a hydrocarbylene group, or a hetero atom-containing hydrocarbylene group in which the hetero atom is at least one kind atom selected from the atomic group consisting of a silicon atom, a nitrogen atom and an oxygen atom. Examples of the hetero atom-containing hydrocarbylene group in which the hetero atom is at least one kind atom selected from the atomic group consisting of a silicon atom, a nitrogen atom and an oxygen atom include a hetero atom-containing hydrocarbylene group in which the hetero atom is a silicon atom, a hetero atom-containing hydrocarbylene group in which the hetero atom is a nitrogen atom, and a hetero atom-containing hydrocarbylene group in which the hetero atom is an oxygen atom. Examples of the hydrocarbylene group include alkylene groups such as a tetramethylene group, a pentamethylene group, a hexamethylene group, and a 2,2,4-trimethylhexane-1,6-diyl group and, among them, an alkylene group having 4 to 7 carbon atoms is preferable, and a pentamethylene group or a hexamethylene group is particularly preferable. Examples of the hetero atom-containing hydrocarbylene group in which the hetero atom is a silicon atom include a group represented by —$Si(CH_3)_2$—$CH_2$—$CH_2$—$Si(CH_3)_2$—. Examples of the hetero atom-containing hydrocarbylene group in which the hetero atom is a nitrogen atom include a group represented by —CH═N—CH═CH—, or a group represented by —CH═N—$CH_2$—$CH_2$—. Examples of the hetero atom-containing hydrocarbylene group in which the hetero atom is an oxygen atom include a group represented by —$CH_2$—$CH_2$—O—$CH_2$—$CH_2$—.

In the formula (4), R$^{41}$ is preferably an alkyl group having 1 to 4 carbon atoms, and more preferably a methyl group or an ethyl group. R$^{42}$ and R$^{43}$ are preferably a hydrocarbyloxy group, more preferably an alkoxy group having 1 to 4 carbon atoms, and further preferably a methoxy group or an ethoxy group. R$^{44}$ and R$^{45}$ are preferably a hydrocarbyl group, more preferably an alkyl group having 1 to 4 carbon atoms, and further preferably a methyl group or an ethyl group. j is preferably an integer of 2 to 4.

Examples of the compound represented by the formula (4) include [(dialkylamino)alkyl]alkoxysilane compounds such as [3-(dimethylamino)propyl]triethoxysilane, [3-(dimethylamino)propyl]trimethoxysilane, [3-(diethylamino)propyl]triethoxysilane, [3-(diethylamino)propyl]trimethoxysilane, [3-(dimethylamino)propyl]methyldiethoxysilane, [2-(dimethylamino)ethyl]triethoxysilane, and [2-(dimethylamino)ethyl]trimethoxysilane; cyclic aminoalkylalkoxysilane compounds such as (1-hexamethyleneiminomethyl)trimethoxysilane, [3-(1-hexamethyleneimino)propyl]triethoxysilane, N-(3-triethoxysilylpropyl)-4,5- dihydroimidazole, and N-(3-trimethoxysilylpropyl)-4,5-imidazole; {[di(tetrahydrofuranyl)amindo]alkyl}alkoxysilane compounds such as {3-[di(tetrahydrofuranyl)amino]propyl}trimethoxysilane and {3-[di(tetrahydrofuranyl)amino]propyl}triethoxysilane; and [N,N-bis(trialkylsilyl)aminoalkyl]alkylalkoxysilane compounds such as {3-[N,N-bis(trimethylsilyl)amino]propyl}methyldimethoxysilane and {3-[N,N-bis(trimethylsilyl)amino]propyl}methyldiethoxysilane. A compound in which $R^{41}$ is an alkyl group having 1 to 4 carbon atoms, $R^{42}$ and $R^{43}$ are an alkoxy group having 1 to 4 carbon atoms, $R^{44}$ and $R^{45}$ are an alkyl group having 1 to 4 carbon atoms, and j is an integer of 2 to 4 is more preferable, and [3-(dimethylamino)propyl]triethoxysilane, [3-(dimethylamino)propyl]trimethoxysilane, [3-(diethylamino)propyl]triethoxysilane, and [3-(diethylamino)propyl]trimethoxysilane are more preferable.

Examples of the compound containing an alkoxysilyl group include, in addition to the aforementioned compounds containing a nitrogen atom and an alkoxysilyl group, tetraalkoxysilanes such as tetramethoxysilane, tetraethoxysilane, and tetra-n-propoxysilane; trialkoxyhydrocarbylsilanes such as methyltrimethoxysilane, methyltriethoxysilane, ethyltrimethoxysilane, and phenyltrimethoxysilane; trialkoxyhalosilanes such as trimethoxychlorosilane, triethoxychlorosilane, and tri-n-propoxychlorosilane; dialkoxydihydrocarbylsilanes such as dimethoxydimethylsilane, diethoxydimethylsilane, and dimethoxydiethylsilane; dialkoxydihalosilanes such as dimethoxydichlorosilane, diethoxydichlorosilane, and di-n-propoxydichlorosilane; monoalkoxytrihydrocarbylsilanes such as methoxytrimethylsilane; monoalkoxytrihalosilanes such as methoxytrichlorosilane and ethoxytrichlorosilane; (glycidoxyalkyl)alkylalkoxysilane compounds such as 2-glycidoxyethyltrimethoxysilane, 2-glycidoxyethyltriethoxysilane, (2-glycidoxyethyl)methyldimethoxysilane, 3-glycidoxypropyltrimethoxysilane, 3-glycidoxypropyltriethoxysilane, and (3-glycidoxypropyl)methyldimethoxysilane; (3,4-epoxycyclohexyl)alkylalkoxysilane compounds such as 2-(3,4-epoxycyclohexyl)ethyltrimethoxysilane and 2-(3,4-epoxycyclohexyl)ethyltriethoxysilane; [(3,4-epoxycyclohexyl)alkyl]alkylalkoxysilane compounds such as [2-(3,4-epoxycyclohexyl)ethyl]methyldimethoxysilane; alkoxysilylalkylsuccinic acid anhydrides such as 3-trimethoxysilylpropylsuccinic acid anhydride and 3-triethoxysilylpropylsuccinic acid anhydride; (methacryloyloxyalkyl)alkoxysilane compounds such as 3-methacryloyloxypropyltrimethoxysilane and 3-methacryloyloxypropyltriethoxysilane.

The compound containing an alkoxysilyl group may contain a nitrogen atom and a group represented by >C═O. Examples of the compound containing an alkoxysilyl group, and containing a nitrogen atom and a group represented by >C═O include tris[(alkoxysilyl)alkyl]isocyanurate compounds such as tris[3-(trimethoxysilyl)propyl]isocyanurate, tris[3-(triethoxysilyl)propyl]isocyanurate, tris[3-(tripropoxysilyl)propyl]isocyanurate, and tris[3-(tributoxysilyl)propyl]isocyanurate. Among them, tris[3-(trialkoxysilyl)propyl]isocyanurate is preferable, tris[3-(trialkoxysilyl)propyl]isocyanurate in which the alkoxy group is an alkoxy group having 1 to 4 carbon atoms is more preferable, and tris[3-(trimethoxysilyl)propyl]isocyanurate is further preferable.

In addition to the aforementioned compounds, preferable examples of the compound containing a nitrogen atom and/or a silicon atom include a compound represented by the following formula (5):

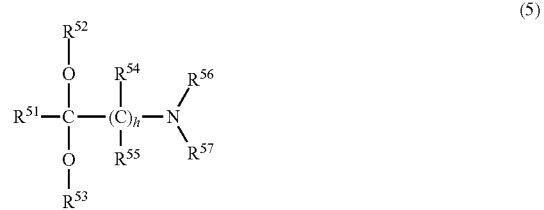

(wherein, $R^{51}$ represents a hydrogen atom, a hydrocarbyl group or a hydrocarbyloxy group, $R^{52}$ and $R^{53}$ represent a hydrocarbyl group. h represents an integer of 0 to 10, $R^{54}$ and $R^{55}$ each represent a hydrogen atom or a hydrocarbyl group, and when there are a plurality of $R^{54}$s, the plurality of $R^{54}$s may be the same or different from one another, and when there are a plurality of $R^{55}$s, the plurality of $R^{55}$s may be the same or different from one another. $R^{56}$ and $R^{57}$ each represent a hydrocarbyl group optionally having a substituent or a trihydrocarbylsilyl group, or $R^{56}$ and $R^{57}$ are bonded to represent a hydrocarbylene group optionally having, as a hetero atom, at least one kind atom selected from the atomic group consisting of a silicon atom, a nitrogen atom and an oxygen atom.)

$R^{51}$ represents a hydrogen atom, a hydrocarbyl group or a hydrocarbyloxy group. The hydrocarbyl group is preferably a hydrocarbyl group having 1 to 4 carbon atoms, more preferably an alkyl group having 1 to 4 carbon atoms, and further preferably a methyl group or an ethyl group. The hydrocarbyloxy group is preferably a hydrocarbyloxy group having 1 to 4 carbon atoms, more preferably an alkoxy group having 1 to 4 carbon atoms, and further preferably a methoxy group or an ethoxy group. Among them, a hydrogen atom is preferable.

$R^{52}$ and $R^{53}$ represent a hydrocarbyl group. The hydrocarbyl group is preferably a hydrocarbyl group having 1 to 4 carbon atoms, more preferably an alkyl group having 1 to 4 carbon atoms, and further preferably a methyl group or an ethyl group. $R^{52}$ and $R^{53}$ may be the same or different from each other.

h represents an integer of 0 to 10, preferably 3 or less, and more preferably 0.

$R^{54}$ and $R^{55}$ each represent a hydrogen atom or a hydrocarbyl group, and when there are a plurality of $R^{54}$s, the plurality of $R^{54}$s may be the same or different from one another, and when there are a plurality of $R^{55}$s, the plurality of $R^{55}$s may be the same or different from one another. The hydrocarbyl group is preferably a hydrocarbyl group having 1 to 4 carbon atoms, more preferably an alkyl group having 1 to 4 carbon atoms, and further preferably a methyl group or an ethyl group.

$R^{56}$ and $R^{57}$ each represent a hydrocarbyl group optionally having a substituent or a trihydrocarbylsilyl group. The hydrocarbyl group optionally having a substituent is a hydrocarbyl group or a substituted hydrocarbyl group. The hydrocarbyl group is preferably a hydrocarbyl group having 1 to 4 carbon atoms. Examples of the substituted hydrocarbyl group include substituted hydrocarbyl groups in which the substituent is a substituted amino group, such as a N,N-dimethylaminomethyl group, a 2-N,N-dimethylaminoethyl group, and a 3-N,N-dimethylaminopropyl group; substituted hydrocarbyl groups in which the substituent is a hydrocarbyloxy group, such as a methoxymethyl group, a methoxyethyl group, and an ethoxyethyl group. Examples of the trihydrocarbylsilyl group include a trimethylsilyl group and a tert-butyl-dimethylsilyl group, and preferably a trimethylsilyl group. Among them, a hydrocarbyl group is preferable, a hydrocarbyl group having 1 to 4 carbon atoms is more preferable, an alkyl group having 1 to 4 carbon atoms is further preferable, and a methyl group or an ethyl group is particularly preferable.

$R^{56}$ and $R^{57}$ may be bonded to form a hydrocarbylene group optionally having, as a hetero atom, at least one kind atom selected from the atomic group consisting of a silicon atom, a nitrogen atom and an oxygen atom. Examples of the hydrocarbylene group include alkylene groups such as a tetramethylene group, a pentamethylene group, a hexamethylene group, and a 2,2,4-trimethylhexane-1,6-diyl group; alkenediyl groups such as a pent-2-ene-1,5-idyl group, and preferably an alkylene group, and more preferably an alkylene group having 4 to 7 carbon atoms. Examples of the hetero atom-containing hydrocarbylene group in which the hetero atom is a silicon atom include a group represented by —Si—$(CH_3)_2$—$CH_2$—$CH_2$—$Si(CH_3)_2$—. Examples of the hetero atom-containing hydrocarbylene group in which the hetero atom is a nitrogen atom include a group represented by —CH═N—CH═CH and a group represented by —CH═N—$CH_2$—$CH_2$—. Examples of the hetero atom-containing hydrocarbylene group in which the hetero atom is an oxygen atom include a group represented by —$CH_2$—$CH_2$—O—$CH_2$—$CH_2$—. Among them, a hydrocarbylene group is preferable, an alkylene group having 4 to 7 carbon atoms is more preferable, and a tetramethylene group, a pentamethylene group, or a hexamethylene group is further preferable.

Examples of the compound represented by the formula (5) include N,N-dialkylformamide dialkyl acetals such as N,N-dimethylformamide dimethyl acetal, N,N-diethylformamide dimethyl acetal, N,N-dimethylformamide diethyl acetal, and N,N-diethylformamide diethyl acetal; N,N-dialkylacetamide dialkyl acetals such as N,N-dimethylacetamide dimethyl acetal, N,N-diethylacetamide dimethyl acetal, N,N-dimethylacetamide diethyl acetal, and N,N-diethylacetamide diethyl acetal.

The compound represented by the formula (5) is preferably a compound in which h is 3 or less, $R^{51}$ is a hydrogen atom, and $R^{52}$, $R^{53}$, $R^{54}$, $R^{55}$, $R^{56}$ and $R^{57}$ are an alkyl group having 1 to 4 carbon atoms, more preferably a compound in which h is 0, $R^{51}$ is a hydrogen atom, and $R^{52}$, $R^{53}$, $R^{56}$ and $R^{57}$ are an alkyl group having 1 to 4 carbon atoms, and particularly preferably N,N-dimethylformamide dimethyl acetal, N,N-diethylformamide dimethyl acetal, N,N-dimethylformamide diethyl acetal, or N,N-diethylformamide diethyl acetal.

The reaction of an active end of a polymer produced by polymerizing a monomer component with the polymerization initiator represented by the formula (1), (it is considered that the active end of a polymer has an alkali metal derived from the polymerization initiator), the compound containing a nitrogen atom and/or a silicon atom and an active end of a conjugated diene polymer is performed by adding the compound containing a nitrogen atom and/or a silicon atom to a polymer solution, and mixing the polymer and the compound containing a nitrogen atom and/or a silicon atom in the solution. The amount of the compound containing a nitrogen atom and/or silicon atom to be added to the polymer solution is usually 0.1 mol to 3 mol, preferably 0.5 mol to 2 mol, and more preferably 0.7 mol to 1.5 mol, per 1 mol of an alkali metal derived from the polymerization initiator represented by the formula (1).

The temperature at which the polymer and the compound containing a nitrogen atom and/or a silicon atom are mixed is 25° C. to 100° C., preferably 35° C. to 90° C., and further preferably 50° C. to 80° C. The contact time is 60 seconds to 5 hours, and preferably 5 minutes to 1 hour.

In the production process of the present invention, a coupling agent may be added to a solution containing a conjugated diene-based polymer using a hydrocarbon as a solvent, from initiation of polymerization of a monomer to recovery of a polymer described later. Examples of the coupling agent include a compound represented by the following formula (6).

$$R^{61}{}_{a}ML_{4-a} \quad (6)$$

(wherein, $R^{61}$ represents an alkyl group, an alkenyl group, a cycloalkenyl group or an aryl group, M represents a silicon atom or a tin atom, L represents a halogen atom or a hydrocarbyloxy group, and a represents an integer of 0 to 2.)

Examples of the coupling agent represented by the formula (6) include silicon tetrachloride, methyltrichlorosilane, dimethyldichlorosilane, trimethylchlorosilane, tin tetrachloride, methyltrichlorotin, dimethyldichlorotin, trimethylchlorotin, tetramethoxysilane, methyltrimethoxysilane, dimethoxydimethylsilane, methyltriethoxysilane, ethyltrimethoxysilane, dimethoxydiethylsilane, diethoxydimethylsilane, tetraethoxysilane, ethyltriethoxysilane, and diethoxydiethylsilane.

In order to enhance processibility of the conjugated diene-based polymer, the amount of the coupling agent used is preferably 0.03 mol or more, and more preferably 0.05 mol or more, per 1 mol of the alkali metal derived from an alkali metal catalyst. In order to enhance fuel cost saving properties, the amount is preferably 0.4 mol or less, and more preferably 0.3 mol or less.

In the production process of the present invention, an unreacted active end may be treated with an alcohol such as methanol or isopropyl alcohol before recovery of a polymer described later.

As a method of recovering a conjugated diene-based polymer from a solution containing a conjugated diene-based polymer using a hydrocarbon as a solvent, known methods can be used, and examples thereof include (A) a method of adding a coagulant to a solution containing a conjugated diene-based polymer and (B) a method of adding steam to a solution containing a conjugated diene-based polymer. The recovered conjugated diene-based polymer may be dried with a known dryer such as a band dryer or an extrusion-type dryer.

The conjugated-diene-based polymer of the present invention is a conjugated diene-based polymer produced by the aforementioned process.

In order to enhance tensile strength at break, the Mooney viscosity ($ML_{1+4}$) of the conjugated diene-based polymer of the present invention is preferably 10 or more, and more preferably 20 or more. Further, in order to enhance processibility, the Mooney viscosity is preferably 200 or less, and more preferably 150 or less. The Mooney viscosity ($ML_{1+4}$) is measured at 100° C. according to JIS K6300 (1994).

In order to enhance fuel cost saving properties, the molecular weight distribution of the conjugated diene-based polymer of the present invention is preferably 1 to 5, and more preferably 1 to 2. A molecular weight distribution is obtained by measuring a number average molecular weight (Mn) and a weight average molecular weight (Mw) by a gel permeation chromatography (GPC) method, and dividing Mw with Mn.

In order to enhance fuel cost saving properties, the content of a monomer unit based on a silicon-containing vinyl compound is preferably 0.01 wt % or more, more preferably 0.02 wt % or more, and further preferably 0.05 wt % or more, per 100 wt % of the conjugated diene-based polymer. In order to enhance economical properties and to increase tensile strength at break, the content is preferably 20 wt % or less, more preferably 2 wt % or less, and further preferably 1 wt % or less.

In order to enhance tensile strength at break, it is preferable that the conjugated diene-based polymer of the present invention contains a monomer unit based on an aromatic vinyl compound, in addition to the monomer unit based on a conjugated diene compound and the monomer unit based on a silicon-containing vinyl compound. Examples of the aromatic vinyl compound include styrene, α-methylstyrene, vinyltoluene, vinylnaphthalene, divinylbenzene, trivinylbenzene, and divinylnaphthalene, and preferably styrene.

The content of the aromatic vinyl compound unit is 0 wt % or more (the content of the conjugated diene compound unit is 100 wt % or less), preferably 10 wt % or more (the content of the conjugated diene compound unit is 90 wt % or less), and more preferably 15 wt % or more (the content of the conjugated diene compound unit is 85 wt % or less), per 100 wt % of the total amount of the conjugated diene compound unit and the aromatic vinyl compound unit. In order to enhance fuel cost saving properties, the content of the aromatic vinyl compound unit is preferably 50 wt % or less (the content of the conjugated diene compound unit is 50 wt % or more), and more preferably 45 wt % or less (the content of the conjugated diene compound unit is 55 wt % or more).

In order to enhance fuel cost saving properties, the vinyl bonding amount in the conjugated diene-based polymer of the present invention is preferably 80 mol % or less, and more preferably 70 mol % or less, per 100 mol % of the content of the conjugated diene unit. In order to enhance gripping properties, the vinyl bonding amount is preferably 10 mol % or more, more preferably 15 mol % or more, further preferably 20 mol % or more, and particularly preferably 40 mol % or more. The vinyl bonding amount is obtained from the absorption intensity around 910 $cm^{-1}$, which is the absorption peak of a vinyl group, by an infrared spectrometric method.

The conjugated diene-based polymer of the present invention can be used as a conjugated diene-based polymer composition by incorporating other polymer components and additives.

Examples of the other polymer component include styrene-butadiene copolymer rubber, polybutadiene rubber, butadiene-isoprene copolymer rubber, and butyl rubber. Examples thereof also include natural rubber, an ethylene-propylene copolymer, and an ethyelene-octene copolymer. One or more kinds of these polymer components are used.

When the other polymer components are incorporated into the conjugated diene-based polymer of the present invention, in order to enhance fuel cost saving properties, the amount of the conjugated diene-based polymer of the present invention incorporated is preferably 10 wt % or more, and more preferably 20 wt % or more, per 100 wt % of the total amount of the polymer components incorporated (including the amount of the conjugated diene-based polymer incorporated).

As the additives, known additives can be used, and examples thereof include vulcanization agents such as sulfur; vulcanization accelerators such as a thiazole-based vulcanization accelerator, a thiuram-based vulcanization accelerator, a sulfenamide-based vulcanization accelerator, and a guanidine-based vulcanization accelerator; vulcanization activating agents such as stearic acid and zinc oxide; organic peroxides such as dicumyl peroxide and ditertiarybutyl peroxide; reinforcing agents such as silica and carbon black; fillers such as calcium carbonate, talc, alumina, clay, aluminum hydroxide, and mica; silane coupling agents; extender oils; processing aids; anti-aging agents; and lubricants.

Examples of the sulfur include powder sulfur, precipitated sulfur, colloidal sulfur, insoluble sulfur, and highly dispersible sulfur. The amount of the sulfur incorporated is preferably 0.1 parts by weight to 15 parts by weight, more preferably 0.3 parts by weight to 10 parts by weight, and further preferably 0.5 parts by weight to 5 parts by weight, per 100 parts by weight of the polymer component.

Examples of the vulcanization accelerator include thiazole-based vulcanization accelerators such as 2-mercaptobenzothiazole, dibenzothiazyl disulfide, and N-cyclohexyl-2-benzothiazylsulfenamide; thiuram-based vulcanization accelerators such as tetramethylthiuram monosulfide and tetramethylthiuram disulfide; sulfenamide-based vulcanization accelerators such as N-cyclohexyl-2-benzothiazolesulfenamide, N-tert-butyl-2-benzothiazolesulfenamide, N-oxyethylene-2-benzothiazolesulfenamide, N-oxyethylene-2-benzothiazolesulfenamide, and N,N'-diisopropyl-2-benzothiazolesulfenamide; guanidine-based vulcanization accelerators such as diphenylguanidine, diorthotolylguanidine, and orthotolylbiguanidine. The amount of the vulcanization accelerator incorporated is preferably 0.1 parts by weight to 5 parts by weight, and more preferably 0.2 parts by weight to 3 parts by weight, per 100 parts by weight of the polymer component.

Examples of the silica include dry silica (silicic acid anhydride), wet silica (hydrous silicic acid), colloidal silica, precipitated silica, calcium silicate, and aluminum silicate. One or more kinds of them can be used. The BET specific surface area of silica is preferably 50 $m^2/g$ to 250 $m^2/g$. The BET specific surface area is measured according to ASTM D1993-03. As commercially available products, trade name Ultrasil VN3-G, manufactured by Degussa, trade name VN3, AQ, ER, and RS-150, manufactured by Tosoh Silica Corporation, and trade name Zeosil 1115MP, 1165MP, manufactured by Rhodia, and the like can be used.

Examples of the carbon black include furnace black, acetylene black, thermal black, channel black, and graphite. Examples of the carbon black include channel carbon black such as EPC, MPC and CC; furnace carbon black such as SAF, ISAF, HAF, MAF, FEF, SRF, GPF, APF, FF, CF, SCF and ECF; thermal carbon black such as FT and MT; and acetylene carbon black. One or more kinds of them can be used.

The nitrogen adsorption specific surface area ($N_2SA$) of carbon black is preferably 5 $m^2/g$ to 200 $m^2/g$, and the dibutyl phthalate (DBP) absorption amount of carbon black is preferably 5 ml/100 g to 300 ml/100 g. The nitrogen adsorption specific surface area is measured according to ASTM D4820-93. The DBP absorption amount is measured according to ASTM D2414-93. As commercially available products, Diablack N339, manufactured by Mitsubishi Chemical Corporation, trade name SEAST 6, SEAST 7HM, and SEAST KH, manufactured by Tokai Carbon Co., Ltd., trade name CK 3, Special Black 4A, manufactured by Degussa, and the like can be used.

When formulated into a conjugated diene-based polymer composition in which a reinforcing agent is incorporated into the conjugated diene-based polymer of the present invention, the amount of the reinforcing agent incorporated is preferably 10 parts by weight to 150 parts by weight, per 100 parts by weight of the amount of the conjugated diene-based polymer of the present invention incorporated. In order to enhance abrasion resistance and strength, the amount incorporated is more preferably 20 parts by weight or more, and further preferably 30 parts by weight or more. In order to enhance reinforcing properties, the amount incorporated is more preferably 120 parts by weight or less, and further preferably 100 parts by weight or less.

In order to enhance fuel cost saving properties, when formulated into a conjugated diene-based polymer composition in which a reinforcing agent is incorporated into the conjugated diene-based polymer of the present invention, it is preferable to use silica as the reinforcing agent. The amount of silica incorporated is preferably 50 parts by weight or more, and more preferably 70 parts by weight or more, per 100 parts by weight of the total amount of the reinforcing agent incorporated.

The weight ratio of the content of silica used as the reinforcing agent and the content of carbon black (the content of silica:the content of carbon black) is preferably 2:1 to 50:1. In order to enhance fuel cost saving properties and reinforcing properties, the weight ratio is more preferably 5:1 to 20:1.

Examples of the silane coupling agent include vinyltrichlorosilane, vinyltriethoxysilane, vinyltris(β-methoxyethoxy) silane, β-(3,4-epoxycyclohexyl)ethyltrimethoxysilane, γ-glycidoxypropyltrimethoxysilane, γ-methacryloxypropyltrimethoxysilane, N-(β-aminoethyl)-γ-aminopropyltrimethoxysilane, N-(β-aminoethyl)-γ-aminopropylmethyldimethoxysilane, N-phenyl-γ-aminopropyltrimethoxysilane, γ-chloropropyltrimethoxysilane, γ-mercaptopropyltrimethoxysilane, γ-aminopropyltriethoxysilane, bis(3-(triethoxysilyl)propyl)disulfide, bis(3-(triethoxysilyl)propyl) tetrasulfide, γ-trimethoxysilylpropyldimethylthiocarbamyl tetrasulfide, and γ-trimethoxysilylpropylbenzothiazyl tetrasulfide. One or more kinds of them are used. As commercially available products, trade name Si69, Si75, manufactured by Degussa and the like can be used.

When formulated into a conjugated diene-based polymer composition in which a silane coupling agent is incorporated into the conjugated diene-based polymer of the present invention, the amount of the silane coupling agent incorporated is preferably 1 part by weight to 20 parts by weight, more preferably 2 parts by weight to 15 parts by weight, and further preferably 5 parts by weight to 10 parts by weight, per 100 parts by weight of the silica.

Examples of the extender oil include aromatic-based mineral oils (viscosity gravity constant (V.G.C. value) 0.900 to 1.049), naphthene-based mineral oils (V.G.C. value 0.850 to 0.899), and paraffin-based mineral oils (V.G.C. value 0.790 to 0.849). The content of polycyclic aromatic compound in the extender oil is preferably less than 3 wt %, and more preferably less than 1 wt %. The polycyclic aromatic content is measured according to the British Institute of Petroleum 346/92 Method. The content of aromatic compound (CA) in the extender oil is preferably 20 wt % or more. One or more kinds of these extender oils are used.

As a method for producing a conjugated diene-based polymer composition by incorporating other polymer components and additives into the conjugated diene-based polymer of the present invention, known methods, for example, a method of kneading each component with a known mixer such as a roll mixer or Banbury mixer can be used.

As kneading condition, when additives other than the vulcanization agent and the vulcanization accelerator are incorporated, the kneading temperature is usually 50° C. to 200° C., and preferably 80° C. to 190° C., and the kneading time is usually 30 seconds to 30 minutes, preferably 1 minute to 30 minutes. When the vulcanization agent and the vulcanization accelerator are incorporated, the kneading temperature is usually 100° C. or lower, preferably room temperature to 80° C. A composition in which the vulcanization agent and the vulcanization accelerator are incorporated is usually subjected to vulcanization treatment such as press vulcanization for use. The vulcanizing temperature is usually 120° C. to 200° C., and preferably 140° C. to 180° C.

The conjugated diene-based polymer composition of the present invention is excellent in fuel cost saving properties, is good in tensile strength at break and is suitably used in tires.

EXAMPLES

The evaluation of physical properties was performed by the following methods.

1. Mooney Viscosity ($ML_{1+4}$)

According to JIS K6300 (1994), the Mooney viscosity of a polymer was measured at 100° C.

2. Vinyl Bonding Amount (Unit: mol %)

The vinyl bonding amount of a polymer was obtained from the absorption intensity around 910 $cm^{-1}$, which is an absorption peak of a vinyl group, by an infrared spectrometric method.

3. Content of Styrene Unit (Unit: wt %)

According to JIS K6383 (1995), the content of a styrene unit in a polymer was obtained from a refractive index.

4. Molecular Weight Distribution (Mw/Mn)

A weight average molecular weight (Mw) and a number average molecular weight (Mn) were measured under the following conditions (1) to (8) by a gel permeation chromatography (GPC) method, and the molecular weight distribution (Mw/Mn) of a polymer was obtained.

(1) Apparatus: HLC-8220, manufactured by Tosoh Corporation (2) Separation column: TSKgel SuperHM-H (two in series), manufactured by Tosoh Corporation (3) Measuring temperature: 40° C.

(4) Carrier: tetrahydrofuran (5) Flow rate: 0.6 mL/minute (6) Injection amount: 5 μL (7) Detector: differential refraction (8) Molecular weight standard: standard polystyrene 5. Fuel Cost Saving Properties A strip-like test piece having a width of 1 mm or 2 mm and a length of 40 mm was punched out from a sheet-like vulcanization molded article, and was subjected to a test. For measurement, loss tangent (tan δ (70° C.)) of a test piece at a temperature of 70° C. was measured with a viscoelasticity measuring apparatus (manufactured by Ueshima Seisakusho Co., Ltd.) under the conditions of a strain of 1% and a frequency of 10 Hz. As this value is smaller, fuel cost saving properties are more excellent.

6. Tensile Strength at Break (Unit: MPa)

According to JIS K6251A, tensile strength at cutting of a vulcanized sheet was measured. A sheet-like vulcanization molded article was punched out with a punching blade to make dumbbell-like No. 3 shape test pieces. The measurement was carried out at a tensile rate of 500 mm/minute.

Example 1

The interior of a polymerization reactor made of stainless steel, equipped with a stirring device, and having an internal volume of 20 L was washed and dried, and replaced with dry nitrogen. Then, 10.2 kg of industrial hexane (density 680 $kg/m^3$), 608 g of 1,3-butadiene, 192 g of styrene, 6.1 ml of tetrahydrofuran, and 4.5 ml of ethylene glycol diethyl ether were placed into the polymerization reactor. Then, in order to detoxify impurities causing inactivation of a polymerization initiator in advance, a small amount of a solution of n-butyllithium in n-hexane as a scavenger was placed into the polymerization reactor.

Into the polymerization reactor was placed 2.74 g of bis(diethylamino)methylvinylsilane. Then, 20.0 mmol of a compound obtained by reacting 3-(N,N-dimethylamino)-1-propyllithium and isoprene [reaction ratio: isoprene/3-(N,N-dimethylamino)-1-propyllithium=2/1 (mol ratio), trade name: AI-200CE2 (cyclohexane solution), manufactured by FMC] as a cyclohexane solution was placed into the polymerization reactor, and a polymerization reaction was initiated. The copolymerization reaction of 1,3-butadiene, styrene and bis(diethylamino)methylvinylsilane was performed for 3 hours at a stirring rate of 130 rpm and a temperature in the polymerization reactor of 65° C., while 1,3-butadiene and styrene were continuously supplied into the polymerization reactor. The amounts of 1,3-butadiene and styrene supplied after initiation of the polymerization reaction were 912 g and 288 g, respectively. The amount of bis(diethylamino)methylvinylsilane placed was 0.14 wt % in the total amount of monomers which had been placed or supplied into the polymerization reactor.

To the polymer solution was added 20 ml of a hexane solution containing 1.2 ml of methanol, and the polymer solution was stirred for 5 minutes. Then, to the polymer solution were added 8.0 g of 2-tert-butyl-6-(3-tert-butyl-2-hydroxy-5-methylbenzyl)-4-methylphenyl acrylate (trade name: Sumilizer GM, manufactured by Sumitomo Chemical Co., Ltd.) and 4.0 g of pentaerythrityltetrakis(3-laurylthiopropionate) (trade name: Sumilizer TP-D, manufactured by Sumitomo Chemical Co., Ltd.). Then, the polymer solution was allowed to stand under ambient temperature for 24 hours, and the solvent was evaporated to obtain a polymer. Thereafter, the resulting polymer was further dried at 55° C. for 12 hours under reduced pressure. The evaluation results of the polymer are shown in Table 1.

One hundred parts by weight of the resulting polymer, 78.4 parts by weight of silica (trade name: Ultrasil VN3-G, manufactured by Degussa), 6.4 parts by weight of a silane coupling agent (trade name: Si69, manufactured by Degussa), 6.4 parts by weight of carbon black (trade name: Diablack N339, manufactured by Mitsubishi Chemical Corporation), 47.6 parts by weight of an extender oil (trade name: JOMO Process NC-140, manufactured by Japan Energy Corporation), 1.5 parts by weight of an anti-aging agent (trade name: Antigen 3C, manufactured by Sumitomo Chemical Co., Ltd.), 2 parts by weight of stearic acid, 2 parts by weight of zinc flower, 1 part by weight of a vulcanization accelerator (trade name: Soxinol CZ, manufactured by Sumitomo Chemical Co., Ltd.), 1 part by weight of a vulcanization accelerator (trade name: Soxinol D, manufactured by Sumitomo Chemical Co., Ltd.), 1.5 parts by weight of a wax (trade name: Sunnoc N, manufactured by Ouchi Shinko Chemical Industrial Co., Ltd.), and 1.4 parts by weight of sulfur were kneaded with Laboplast Mill to prepare a polymer composition. The resulting polymer composition was molded into a sheet with a 6 inch roll, and the sheet was heated at 160° C. for 45 minutes for vulcanization to prepare a vulcanized sheet. The evaluation results of physical properties of the vulcanized sheet are shown in Table 1.

Comparative Example 1

The interior of a polymerization reactor made of stainless steel, equipped with a stirring device, and having an internal volume of 20 L was washed and dried, and replaced with dry nitrogen. Then, 10.2 kg of industrial hexane (density 680 kg/m$^3$), 608 g of 1,3-butadiene, 192 g of styrene, 6.1 ml of tetrahydrofuran, and 4.4 ml of ethylene glycol diethyl ether were placed into the polymerization reactor. Then, in order to detoxify impurities causing inactivation of a polymerization initiator in advance, a small amount of a solution of n-butyllithium in n-hexane as a scavenger was placed.

Into the polymerization reactor was placed 2.63 g of bis(diethylamino)methylvinylsilane. Then, a solution of n-butyllithium in n-hexane (content of n-butyllithium 12.3 mmol) as a polymerization initiator was placed into the polymerization reactor, and a polymerization reaction was initiated. The copolymerization reaction of 1,3-butadiene, styrene and bis(diethylamino)methylvinylsilane was performed for 3 hours at a stirring rate of 130 rpm and a temperature in the polymerization reactor of 65° C., while 1,3-butadiene and styrene were continuously supplied into the polymerization reactor. The amounts of 1,3-butadiene and styrene supplied after initiation of the polymerization reaction were 912 g and 288 g, respectively. The amount of bis(diethylamino)methylvinylsilane placed was 0.13 wt % in the total amount of monomers which had been placed or supplied into the polymerization reactor.

To the polymer solution was added 20 ml of a hexane solution containing 0.8 ml of methanol, and the polymer solution was stirred for 5 minutes. Then, to the polymer solution were added 8.0 g of 2-tert-butyl-6-(3-tert-butyl-2-hydroxy-5-methylbenzyl)-4-methylphenyl acrylate (trade name: Sumilizer GM, manufactured by Sumitomo Chemical Co., Ltd.) and 4.0 g of pentaerythrityltetrakis(3-laurylthiopropionate) (trade name: Sumilizer TP-D, manufactured by Sumitomo Chemical Co., Ltd.), and the polymer solution was then allowed to stand under ambient temperature for 24 hours, and the solvent was evaporated to obtain a polymer. Thereafter, the resulting polymer was further dried at 55° C. for 12 hours under reduced pressure. The evaluation results of the polymer are shown in Table 1.

One hundred parts by weight of the resulting polymer, 78.4 parts by weight of silica (trade name: Ultrasil VN3-G, manufactured by Degussa), 6.4 parts by weight of a silane coupling agent (trade name: Si69, manufactured by Degussa), 6.4 parts by weight of carbon black (trade name: Diablack N339, manufactured by Mitsubishi Chemical Corporation), 47.6 parts by weight of an extender oil (trade name: JOMO Process NC-140, manufactured by Japan Energy Corporation), 1.5 parts by weight of an anti-aging agent (trade name: Antigen 3C, manufactured by Sumitomo Chemical Co., Ltd.), 2 parts by weight of stearic acid, 2 parts by weight of zinc flower, 1 part by weight of a vulcanization accelerator (trade name: Soxinol CZ, manufactured by Sumitomo Chemical Co., Ltd.), 1 part by weight of a vulcanization accelerator (trade name: Soxinol D, manufactured by Sumitomo Chemical Co., Ltd.), 1.5 parts by weight of a wax (trade name: Sunnoc N, manufactured by Ouchi Shinko Chemical Industrial Co., Ltd.), and 1.4 parts by weight of sulfur were kneaded with Laboplast Mill to prepare a polymer composition. The resulting polymer composition was molded into a sheet with a 6 inch roll, and the sheet was heated at 160° C. for 45 minutes for vulcanization to prepare a vulcanized sheet. The evaluation results of physical properties of the vulcanized sheet are shown in Table 1.

Comparative Example 2

The interior of a polymerization reactor made of stainless steel, equipped with a stirring device, and having an internal volume of 20 L was washed and dried, and replaced with dry nitrogen. Then, 10.2 kg of industrial hexane (density 680 kg/m$^3$), 608 g of 1,3-butadiene, 192 g of styrene, 6.1 ml of tetrahydrofuran, and 4.2 ml of ethylene glycol diethyl ether were placed into the polymerization reactor. Then, in order to detoxify impurities causing inactivation of a polymerization initiator in advance, a small amount of a solution of n-butyllithium in n-hexane as a scavenger was placed.

Into the polymerization reactor was placed 20.0 mmol of a compound obtained by reacting 3-(N,N-dimethylamino)-1-propyllithium and isoprene [reaction ratio: isoprene/3-(N,N-dimethylamino)-1-propyllithium=2/1 (mol ratio), trade name: AI-200CE2 (cyclohexane solution), manufactured by FMC] as a cyclohexane solution, and a polymerization reaction was initiated. The copolymerization reaction of 1,3-butadiene and styrene was performed for 3 hours at a stirring rate of 130 rpm and a temperature in the polymerization reactor of 65° C., while 1,3-butadiene and styrene were continuously supplied into the polymerization reactor. The amounts of 1,3-butadiene and styrene supplied after initiation of the polymerization reaction were 912 g and 288 g, respectively.

To the polymer solution was added 20 ml of a hexane solution containing 1.2 ml of methanol, and the polymer solution was stirred for 5 minutes. Then, to the polymer solution were added 8.0 g of 2-tert-butyl-6-(3-tert-butyl-2-hydroxy-5-methylbenzyl)-4-methylphenyl acrylate (trade name: Sumilizer GM, manufactured by Sumitomo Chemical Co., Ltd.) and 4.0 g of pentaerythrityltetrakis(3-laurylthiopropionate) (trade name: Sumilizer TP-D, manufactured by Sumitomo Chemical Co., Ltd.), and the polymer solution was then allowed to stand under ambient temperature for 24 hours, and the solvent was evaporated to obtain a polymer. Thereafter, the resulting polymer was further dried at 55° C. for 12 hours under reduced pressure. The evaluation results of the polymer are shown in Table 1.

One hundred parts by weight of the resulting polymer, 78.4 parts by weight of silica (trade name: Ultrasil VN3-G, manufactured by Degussa), 6.4 parts by weight of a silane coupling agent (trade name: Si69, manufactured by Degussa), 6.4 parts by weight of carbon black (trade name: Diablack N339, manufactured by Mitsubishi Chemical Corporation), 47.6 parts by weight of an extender oil (trade name: JOMO Process NC-140, manufactured by Japan Energy Corporation), 1.5 parts by weight of an anti-aging agent (trade name: Antigen 3C, manufactured by Sumitomo Chemical Co., Ltd.), 2 parts by weight of stearic acid, 2 parts by weight of zinc flower, 1 part by weight of a vulcanization accelerator (trade name: Soxinol CZ, manufactured by Sumitomo Chemical Co., Ltd.), 1 part by weight of a vulcanization accelerator (trade name: Soxinol D, manufactured by Sumitomo Chemical Co., Ltd.), 1.5 parts by weight of a wax (trade name: Sunnoc N, manufactured by Ouchi Shinko Chemical Industrial Co., Ltd.), and 1.4 parts by weight of sulfur were kneaded with Laboplast Mill to prepare a polymer composition. The resulting polymer composition was molded into a sheet with a 6 inch roll, and the sheet was heated at 160° C. for 45 minutes for vulcanization to prepare a vulcanized sheet. The evaluation results of physical properties of the vulcanized sheet are shown in Table 1.

TABLE 1

| | | Example 1 | Comparative Example 1 | Comparative Example 2 |
|---|---|---|---|---|
| Mooney viscosity | — | 52.9 | 40.9 | 52.2 |
| Vinyl bonding amount | mol % | 56.4 | 57.6 | 55.6 |
| Content of styrene unit | wt % | 24.6 | 24.4 | 24.8 |
| Molecular weight distribution | — | 1.12 | 1.09 | 1.12 |
| Fuel cost saving properties tanδ (70° C.) | — | 0.109 | 0.141 | 0.191 |
| Tensile strength at break | MPa | 15.3 | 14.3 | 14.4 |

Example 2

The interior of a polymerization reactor made of stainless steel, equipped with a stirring device, and having an internal volume of 20 L was washed and dried, and replaced with dry nitrogen. Then, 10.2 kg of industrial hexane (density 680 kg/m$^3$), 608 g of 1,3-butadiene, 192 g of styrene, 6.1 ml of tetrahydrofuran, and 4.5 ml of ethylene glycol diethyl ether were placed into the polymerization reactor. Then, in order to detoxify impurities causing inactivation of a polymerization initiator in advance, a small amount of a solution of n-butyllithium in n-hexane as a scavenger was placed into the polymerization reactor.

Into the polymerization reactor was placed 2.74 g of bis(diethylamino)methylvinylsilane. Then, 18.9 mmol of a compound obtained by reacting 3-(N,N-dimethylamino)-1-propyllithium and isoprene [reaction ratio: isoprene/3-(N,N-dimethylamino)-1-propyllithium=2/1 (mol ratio), trade name: AI-200CE2 (cyclohexane solution), manufactured by FMC] as a cyclohexane solution was placed into the polymerization reactor, and a polymerization reaction was initiated. The copolymerization reaction of 1,3-butadiene, styrene and bis(diethylamino)methylvinylsilane was performed for 3 hours at a stirring rate of 130 rpm and a temperature in the polymerization reactor of 65° C., while 1,3-butadiene and styrene were continuously supplied into the polymerization reactor. The amounts of 1,3-butadiene and styrene supplied after initiation of the polymerization reaction were 912 g and 288 g, respectively. The amount of bis(diethylamino)methylvinylsilane placed was 0.14 wt % in the total amount of monomers which had been placed or supplied into the polymerization reactor.

Then, the resulting polymer solution was stirred in the polymerization reactor at a stirring rate of 130 rpm, while the temperature of the polymerization reactor was retained at 65° C., 18.9 mmol of N-(3-dimethylaminopropyl)acrylamide was added to the polymer solution, and the mixture was stirred for 15 minutes.

To the polymer solution was added 20 ml of a hexane solution containing 1.2 ml of methanol, and the polymer solution was stirred for 5 minutes. Then, to the polymer solution were added 8.0 g of 2-tert-butyl-6-(3-tert-butyl-2-hydroxy-5-methylbenzyl)-4-methylphenyl acrylate (trade name: Sumilizer GM, manufactured by Sumitomo Chemical Co., Ltd.) and 4.0 g of pentaerythrityltetrakis(3-laurylthiopropionate) (trade name: Sumilizer TP-D, manufactured by Sumitomo Chemical Co., Ltd.), and the polymer solution was then allowed to stand under ambient temperature for 24 hours, and the solvent was evaporated to obtain a polymer. Thereafter, the resulting polymer was further dried at 55° C. for 12 hours under reduced pressure. The evaluation results of the polymer are shown in Table 2.

One hundred parts by weight of the resulting polymer, 78.4 parts by weight of silica (trade name: Ultrasil VN3-G, manufactured by Degussa), 6.4 parts by weight of a silane coupling agent (trade name: Si69, manufactured by Degussa), 6.4 parts by weight of carbon black (trade name: Diablack N339, manufactured by Mitsubishi Chemical Corporation), 47.6 parts by weight of an extender oil (trade name: JOMO Process NC-140, manufactured by Japan Energy Corporation), 1.5 parts by weight of an anti-aging agent (trade name: Antigen 3C, manufactured by Sumitomo Chemical Co., Ltd.), 2 parts by weight of stearic acid, 2 parts by weight of zinc flower, 1 part by weight of a vulcanization accelerator (trade name: Soxinol CZ, manufactured by Sumitomo Chemical Co., Ltd.), 1 part by weight of a vulcanization accelerator (trade name: Soxinol D, manufactured by Sumitomo Chemical Co., Ltd.), 1.5 parts by weight of a wax (trade name: Sunnoc N, manufactured by Ouchi Shinko Chemical Industrial Co., Ltd.), and 1.4 parts by weight of sulfur were kneaded with Laboplast Mill to prepare a polymer composition. The resulting polymer composition was molded into a sheet with a 6 inch roll, and the sheet was heated at 160° C. for 45 minutes for vulcanization to prepare a vulcanized sheet. The evaluation results of physical properties of the vulcanized sheet are shown in Table 2.

Example 3

The interior of a polymerization reactor made of stainless steel, equipped with a stirring device, and having an internal volume of 20 L was washed and dried, and replaced with dry nitrogen. Then, 10.2 kg of industrial hexane (density 680 kg/m$^3$), 608 g of 1,3-butadiene, 192 g of styrene, 6.1 ml of tetrahydrofuran, and 4.5 ml of ethylene glycol diethyl ether were placed into the polymerization reactor. Then, in order to detoxify impurities causing inactivation of a polymerization initiator in advance, a small amount of a solution of n-butyllithium in n-hexane as a scavenger was placed into the polymerization reactor.

Into the polymerization reactor was placed 2.74 g of bis(diethylamino)methylvinylsilane. Then, 19.6 mmol of a compound obtained by reacting 3-(N,N-dimethylamino)-1-propyllithium and isoprene [reaction ratio: isoprene/3-(N,N-dimethylamino)-1-propyllithium=2/1 (mol ratio), trade name: AI-200CE2 (cyclohexane solution), manufactured by FMC] as a cyclohexane solution was placed into the polymerization reactor, and a polymerization reaction was initiated. The copolymerization reaction of 1,3-butadiene, styrene and bis(diethylamino)methylvinylsilane was performed for 3 hours at a stirring rate of 130 rpm and a temperature in the polymerization reactor of 65° C., while 1,3-butadiene and styrene were continuously supplied into the polymerization reactor. The amounts of 1,3-butadiene and styrene supplied after initiation of the polymerization reaction were 912 g and 288 g, respectively. The amount of bis(diethylamino)methylvinylsilane placed was 0.14 wt % in the total amount of monomers which had been placed or supplied into the polymerization reactor.

Then, the resulting polymer solution was stirred in the polymerization reactor at a stirring rate of 130 rpm, while the temperature of the polymerization reactor was retained at 65° C., 19.6 mmol of [3-(diethylamino)propyl]trimethoxysilane was added to the polymer solution, and the mixture was stirred for 15 minutes.

To the polymer solution was added 20 ml of a hexane solution containing 1.2 ml of methanol, and the polymer solution was stirred for 5 minutes. Then, to the polymer solution were added 8.0 g of 2-tert-butyl-6-(3-tert-butyl-2-hydroxy-5-methylbenzyl)-4-methylphenyl acrylate (trade name: Sumilizer GM, manufactured by Sumitomo Chemical Co., Ltd.) and 4.0 g of pentaerythrityltetrakis(3-laurylthiopropionate) (trade name: Sumilizer TP-D, manufactured by Sumitomo Chemical Co., Ltd.), and the polymer solution was then allowed to stand under ambient temperature for 24 hours, and the solvent was evaporated to obtain a polymer. Thereafter, the resulting polymer was further dried at 55° C. for 12 hours under reduced pressure. The evaluation results of the polymer are shown in Table 2.

One hundred parts by weight of the resulting polymer, 78.4 parts by weight of silica (trade name: Ultrasil VN3-G, manufactured by Degussa), 6.4 parts by weight of a silane coupling agent (trade name: Si69, manufactured by Degussa), 6.4 parts by weight of carbon black (trade name: Diablack N339, manufactured by Mitsubishi Chemical Corporation), 47.6 parts by weight of an extender oil (trade name: JOMO Process NC-140, manufactured by Japan Energy Corporation), 1.5 parts by weight of an anti-aging agent (trade name: Antigen 3C, manufactured by Sumitomo Chemical Co., Ltd.), 2 parts by weight of stearic acid, 2 parts by weight of zinc flower, 1 part by weight of a vulcanization accelerator (trade name: Soxinol CZ, manufactured by Sumitomo Chemical Co., Ltd.), 1 part by weight of a vulcanization accelerator (trade name: Soxinol D, manufactured by Sumitomo Chemical Co., Ltd.), 1.5 parts by weight of a wax (trade name: Sunnoc N, manufactured by Ouchi Shinko Chemical Industrial Co., Ltd.), and 1.4 parts by weight of sulfur were kneaded with Laboplast Mill to prepare a polymer composition. The resulting polymer composition was molded into a sheet with a 6 inch roll, and the sheet was heated at 160° C. for 45 minutes for vulcanization to prepare a vulcanized sheet. The evaluation results of physical properties of the vulcanized sheet are shown in Table 2.

TABLE 2

| | | Example 2 | Example 3 |
|---|---|---|---|
| Mooney viscosity | — | 43.1 | 48.4 |
| Vinyl bonding amount | mol % | 56.6 | 57.0 |
| Content of styrene unit | wt % | 24.6 | 24.6 |
| Molecular weight distribution | — | 1.13 | 1.24 |
| Fuel cost saving properties tanδ (70° C.) | — | 0.098 | 0.122 |
| Tensile strength at break | MPa | 16.7 | 10.8 |

Example 4

The interior of a polymerization reactor made of stainless steel, equipped with a stirring device, and having an internal volume of 20 L was washed and dried, and replaced with dry nitrogen. Then, 10.2 kg of industrial hexane (density 680 kg/m$^3$), 608 g of 1,3-butadiene, 192 g of styrene, 6.1 ml of tetrahydrofuran, and 4.6 ml of ethylene glycol diethyl ether were placed into the polymerization reactor. Then, in order to detoxify impurities causing inactivation of a polymerization initiator in advance, a small amount of a solution of n-butyllithium in n-hexane as a scavenger was placed into the polymerization reactor.

Into the polymerization reactor was placed 2.74 g of bis(diethylamino)methylvinylsilane. Then, 14.26 mmol of a compound obtained by reacting 3-(N,N-dimethylamino)-1-propyllithium and isoprene [reaction ratio: isoprene/3-(N,N-dimethylamino)-1-propyllithium=2/1 (mol ratio), trade name: AI-200CE2 (cyclohexane solution), manufactured by FMC] as a cyclohexane solution was placed into the polymerization reactor, and a polymerization reaction was initiated. The copolymerization reaction of 1,3-butadiene, styrene and bis(diethylamino)methylvinylsilane was performed for 3 hours at a stirring rate of 130 rpm and a temperature in the polymerization reactor of 65° C., while 1,3-butadiene and styrene were continuously supplied into the polymerization reactor. The amounts of 1,3-butadiene and styrene supplied after initiation of the polymerization reaction were 912 g and 288 g, respectively. The amount of bis(diethylamino)methylvinylsilane placed was 0.14 wt % in the total amount of monomers which had been placed or supplied into the polymerization reactor.

Then, the resulting polymerization reaction solution was stirred at a stirring rate of 130 rpm, while the temperature of the polymerization reactor was retained at 65° C., 14.25 mmol of N-phenyl-2-pyrrolidone was added, and the mixture was stirred for 15 minutes.

To the polymer solution was added 20 ml of a hexane solution containing 1.2 ml of methanol, and the polymer solution was stirred for 5 minutes. Then, to the polymer solution were added 8.0 g of 2-tert-butyl-6-(3-tert-butyl-2-hydroxy-5-methylbenzyl)-4-methylphenyl acrylate (trade name: Sumilizer GM, manufactured by Sumitomo Chemical Co., Ltd.) and 4.0 g of pentaerythrityltetrakis(3-laurylthiopropionate) (trade name: Sumilizer TP-D, manufactured by Sumitomo Chemical Co., Ltd.), and the polymer solution was then allowed to stand under ambient temperature for 24 hours, and the solvent was evaporated to obtain a polymer. Thereafter, the resulting polymer was further dried at 55° C. for 12 hours under reduced pressure. The evaluation results of the polymer are shown in Table 3.

One hundred parts by weight of the resulting polymer, 78.4 parts by weight of silica (trade name: Ultrasil VN3-G, manufactured by Degussa), 6.4 parts by weight of a silane coupling agent (trade name: Si69, manufactured by Degussa), 6.4 parts by weight of carbon black (trade name: Diablack N339, manufactured by Mitsubishi Chemical Corporation), 47.6 parts by weight of an extender oil (trade name: JOMO Process NC-140, manufactured by Japan Energy Corporation), 1.5 parts by weight of an anti-aging agent (trade name: Antigen 3C, manufactured by Sumitomo Chemical Co., Ltd.), 2 parts by weight of stearic acid, 2 parts by weight of zinc flower, 1 part by weight of a vulcanization accelerator (trade name: Soxinol CZ, manufactured by Sumitomo Chemical Co., Ltd.), 1 part by weight of a vulcanization accelerator (trade name: Soxinol D, manufactured by Sumitomo Chemical Co., Ltd.), 1.5 parts by weight of a wax (trade name: Sunnoc N, manufactured by Ouchi Shinko Chemical Industrial Co., Ltd.), and 1.4 parts by weight of sulfur were kneaded with Laboplast Mill to prepare a polymer composition. The resulting polymer composition was molded into a sheet with a 6 inch roll, and the sheet was heated at 160° C. for 45 minutes for vulcanization to prepare a vulcanized sheet. The evaluation results of physical properties of the vulcanized sheet are shown in Table 3.

Example 5

The interior of a polymerization reactor made of stainless steel, equipped with a stirring device, and having an internal volume of 20 L was washed and dried, and replaced with dry nitrogen. Then, 10.2 kg of industrial hexane (density 680 kg/m$^3$), 608 g of 1,3-butadiene, 192 g of styrene, 6.1 ml of tetrahydrofuran, and 4.6 ml of ethylene glycol diethyl ether were placed into the polymerization reactor. Then, in order to detoxify impurities causing inactivation of a polymerization initiator in advance, a small amount of a solution of n-butyllithium in n-hexane as a scavenger was placed into the polymerization reactor.

Into the polymerization reactor was placed 2.74 g of bis(diethylamino)methylvinylsilane. Then, 25.00 mmol of a compound obtained by reacting 3-(N,N-dimethylamino)-1-propyllithium and isoprene [reaction ratio: isoprene/3-(N,N-dimethylamino)-1-propyllithium=2/1 (mol ratio), trade name: AI-200CE2 (cyclohexane solution), manufactured by FMC] as a cyclohexane solution was placed into the polymerization reactor, and a polymerization reaction was initiated. The copolymerization reaction of 1,3-butadiene, styrene and bis(diethylamino)methylvinylsilane was performed for 3 hours at a stirring rate of 130 rpm and a temperature in the polymerization reactor of 65° C., while 1,3-butadiene and styrene were continuously supplied into the polymerization reactor. The amounts of 1,3-butadiene and styrene supplied after initiation of the polymerization reaction were 912 g and 288 g, respectively. The amount of bis(diethylamino)methylvinylsilane placed was 0.14 wt % in the total amount of monomers which had been placed or supplied into the polymerization reactor.

Then, the resulting polymerization reaction solution was stirred at a stirring rate of 130 rpm, while the temperature of the polymerization reactor was retained at 65° C., 25.00 mmol of 1,3,5-tris(3-trimethoxysilylpropyl)isocyanurate was added, and the mixture was stirred for 15 minutes.

To the polymer solution was added 20 ml of a hexane solution containing 1.2 ml of methanol, and the polymer solution was stirred for 5 minutes. Then, to the polymer solution were added 8.0 g of 2-tert-butyl-6-(3-tert-butyl-2-hydroxy-5-methylbenzyl)-4-methylphenyl acrylate (trade name: Sumilizer GM, manufactured by Sumitomo Chemical Co., Ltd.) and 4.0 g of pentaerythrityltetrakis(3-laurylthiopropionate) (trade name: Sumilizer TP-D, manufactured by Sumitomo Chemical Co., Ltd.), and the polymer solution was then allowed to stand under ambient temperature for 24 hours, and the solvent was evaporated to obtain a polymer. Thereafter, the resulting polymer was further dried at 55° C. for 12 hours under reduced pressure. The evaluation results of the polymer are shown in Table 3.

One hundred parts by weight of the resulting polymer, 78.4 parts by weight of silica (trade name: Ultrasil VN3-G, manufactured by Degussa), 6.4 parts by weight of a silane coupling agent (trade name: Si69, manufactured by Degussa), 6.4 parts by weight of carbon black (trade name: Diablack N339, manufactured by Mitsubishi Chemical Corporation), 47.6 parts by weight of an extender oil (trade name: JOMO Process NC-140, manufactured by Japan Energy Corporation), 1.5 parts by weight of an anti-aging agent (trade name: Antigen 3C, manufactured by Sumitomo Chemical Co., Ltd.), 2 parts by weight of stearic acid, 2 parts by weight of zinc flower, 1 part by weight of a vulcanization accelerator (trade name: Soxinol CZ, manufactured by Sumitomo Chemical Co., Ltd.), 1 part by weight of a vulcanization accelerator (trade name: Soxinol D, manufactured by Sumitomo Chemical Co., Ltd.), 1.5 parts by weight of a wax (trade name: Sunnoc N, manufactured by Ouchi Shinko Chemical Industrial Co., Ltd.), and 1.4 parts by weight of sulfur were kneaded with Laboplast Mill to prepare a polymer composition. The resulting polymer composition was molded into a sheet with a 6 inch roll, and the sheet was heated at 160° C. for 45 minutes for vulcanization to prepare a vulcanized sheet. The evaluation results of physical properties of the vulcanized sheet are shown in Table 3.

Example 6

The interior of a polymerization reactor made of stainless steel, equipped with a stirring device, and having an internal volume of 30 L was washed and dried, and replaced with dry nitrogen. Then, 15.3 kg of industrial hexane (density 680 kg/$m^3$), 912 g of 1,3-butadiene, 288 g of styrene, 9.1 ml of tetrahydrofuran, and 6.9 ml of ethylene glycol diethyl ether were placed into the polymerization reactor. Then, in order to detoxify impurities causing inactivation of a polymerization initiator in advance, a small amount of a solution of n-butyllithium in n-hexane as a scavenger was placed into the polymerization reactor.

Into the polymerization reactor was placed 4.11 g of bis (diethylamino)methylvinylsilane. Then, 21.30 mmol of a compound obtained by reacting 3-(N,N-dimethylamino)-1-propyllithium and isoprene [reaction ratio: isoprene/3-(N,N-dimethylamino)-1-propyllithium=2/1 (mol ratio), trade name: AI-200CE2 (cyclohexane solution), manufactured by FMC] as a cyclohexane solution was placed into the polymerization reactor, and a polymerization reaction was initiated. The copolymerization reaction of 1,3-butadiene, styrene and bis(diethylamino)methylvinylsilane was performed for 3 hours at a stirring rate of 130 rpm and a temperature in the polymerization reactor of 65° C., while 1,3-butadiene and styrene were continuously supplied into the polymerization reactor. The amounts of 1,3-butadiene and styrene supplied after initiation of the polymerization reaction were 1368 g and 432 g, respectively. The amount of bis(diethylamino) methylvinylsilane placed was 0.14 wt % in the total amount of monomers which had been placed or supplied into the polymerization reactor.

Then, the resulting polymerization reaction solution was stirred at a stirring rate of 130 rpm, while the temperature of the polymerization reactor was retained at 65° C., 21.30 mmol of N,N-dimethylformamide dimethyl acetal was added, and the mixture was stirred for 15 minutes.

To the polymer solution was added 20 ml of a hexane solution containing 1.8 ml of methanol, and the polymer solution was stirred for 5 minutes. Then, to the polymer solution were added 12.0 g of 2-tert-butyl-6-(3-tert-butyl-2-hydroxy-5-methylbenzyl)-4-methylphenyl acrylate (trade name: Sumilizer GM, manufactured by Sumitomo Chemical Co., Ltd.) and 6.0 g of pentaerythrityltetrakis(3-laurylthiopropionate) (trade name: Sumilizer TP-D, manufactured by Sumitomo Chemical Co., Ltd.), and the polymer solution was then allowed to stand under ambient temperature for 24 hours, and the solvent was evaporated to obtain a polymer. Thereafter, the resulting polymer was further dried at 55° C. for 12 hours under reduced pressure. The evaluation results of the polymer are shown in Table 3.

One hundred parts by weight of the resulting polymer, 78.4 parts by weight of silica (trade name: Ultrasil VN3-G, manufactured by Degussa), 6.4 parts by weight of a silane coupling agent (trade name: Si69, manufactured by Degussa), 6.4 parts by weight of carbon black (trade name: Diablack N339, manufactured by Mitsubishi Chemical Corporation), 47.6 parts by weight of an extender oil (trade name: JOMO Process NC-140, manufactured by Japan Energy Corporation), 1.5 parts by weight of an anti-aging agent (trade name: Antigen 3C, manufactured by Sumitomo Chemical Co., Ltd.), 2 parts by weight of stearic acid, 2 parts by weight of zinc flower, 1 part by weight of a vulcanization accelerator (trade name: Soxinol CZ, manufactured by Sumitomo Chemical Co., Ltd.), 1 part by weight of a vulcanization accelerator (trade name: Soxinol D, manufactured by Sumitomo Chemical Co., Ltd.), 1.5 parts by weight of a wax (trade name: Sunnoc N, manufactured by Ouchi Shinko Chemical Industrial Co., Ltd.), and 1.4 parts by weight of sulfur were kneaded with Laboplast Mill to prepare a polymer composition. The resulting polymer composition was molded into a sheet with a 6 inch roll, and the sheet was heated at 160° C. for 45 minutes for vulcanization to prepare a vulcanized sheet. The evaluation results of physical properties of the vulcanized sheet are shown in Table 3.

Example 7

The interior of a polymerization reactor made of stainless steel, equipped with a stirring device, and having an internal volume of 20 L was washed and dried, and replaced with dry nitrogen. Then, 10.2 kg of industrial hexane (density 680 kg/$m^3$), 608 g of 1,3-butadiene, 192 g of styrene, 6.1 ml of tetrahydrofuran, and 4.7 ml of ethylene glycol diethyl ether were placed into the polymerization reactor. Then, in order to detoxify impurities causing inactivation of a polymerization initiator in advance, a small amount of a solution of n-butyllithium in n-hexane as a scavenger was placed into the polymerization reactor.

Into the polymerization reactor was placed 2.74 g of bis (diethylamino)methylvinylsilane. Then, 14.20 mmol of a compound obtained by reacting 3-(N,N-dimethylamino)-1-propyllithium and isoprene [reaction ratio: isoprene/3-(N,N-dimethylamino)-1-propyllithium=2/1 (mol ratio), trade name: AI-200CE2 (cyclohexane solution), manufactured by FMC] as a cyclohexane solution was placed into the polymerization reactor, and a polymerization reaction was initiated. The copolymerization reaction of 1,3-butadiene, styrene and bis(diethylamino)methylvinylsilane was performed for 3 hours at a stirring rate of 130 rpm and a temperature in the polymerization reactor of 65° C., while 1,3-butadiene and styrene were continuously supplied into the polymerization reactor. The amounts of 1,3-butadiene and styrene supplied after initiation of the polymerization reaction were 912 g and 288 g, respectively. The amount of bis(diethylamino)methylvinylsilane placed was 0.14 wt % in the total amount of monomers which had been placed or supplied into the polymerization reactor.

Then, the resulting polymerization reaction solution was stirred at a stirring rate of 130 rpm, while the temperature of the polymerization reactor was retained at 65° C., 14.20 mmol of 4-dimethylaminobenzophenone was added, and the mixture was stirred for 15 minutes.

To the polymer solution was added 20 ml of a hexane solution containing 1.2 ml of methanol, and the polymer solution was stirred for 5 minutes. Then, to the polymer solution were added 8.0 g of 2-tert-butyl-6-(3-tert-butyl-2-hydroxy-5-methylbenzyl)-4-methylphenyl acrylate (trade name: Sumilizer GM, manufactured by Sumitomo Chemical Co., Ltd.) and 4.0 g of pentaerythrityltetrakis(3-laurylthiopropionate) (trade name: Sumilizer TP-D, manufactured by Sumitomo Chemical Co., Ltd.), and the polymer solution was then allowed to stand under ambient temperature for 24 hours, and the solvent was evaporated to obtain a polymer. Thereafter, the resulting polymer was further dried at 55° C. for 12 hours under reduced pressure. The evaluation results of the polymer are shown in Table 3.

One hundred parts by weight of the resulting polymer, 78.4 parts by weight of silica (trade name: Ultrasil VN3-G, manufactured by Degussa), 6.4 parts by weight of a silane coupling agent (trade name: Si69, manufactured by Degussa), 6.4 parts by weight of carbon black (trade name: Diablack N339, manufactured by Mitsubishi Chemical Corporation), 47.6 parts by weight of an extender oil (trade name: JOMO Process NC-140, manufactured by Japan Energy Corporation), 1.5 parts by weight of an anti-aging agent (trade name: Antigen 3C, manufactured by Sumitomo Chemical Co., Ltd.), 2 parts by weight of stearic acid, 2 parts by weight of zinc flower, 1 part by weight of a vulcanization accelerator (trade name: Soxinol CZ, manufactured by Sumitomo Chemical Co., Ltd.), 1 part by weight of a vulcanization accelerator (trade name: Soxinol D, manufactured by Sumitomo Chemical Co., Ltd.), 1.5 parts by weight of a wax (trade name: Sunnoc N, manufactured by Ouchi Shinko Chemical Industrial Co., Ltd.), and 1.4 parts by weight of sulfur were kneaded with Laboplast Mill to prepare a polymer composition. The resulting polymer composition was molded into a sheet with a 6 inch roll, and the sheet was heated at 160° C. for 45 minutes for vulcanization to prepare a vulcanized sheet. The evaluation results of physical properties of the vulcanized sheet are shown in Table 3.

TABLE 3

| | | Example 4 | Example 5 | Example 6 | Example 7 |
|---|---|---|---|---|---|
| Mooney viscosity | — | 55.4 | 52.9 | 51.2 | 43.1 |
| Vinyl bonding amount | mol % | 57.2 | 57.1 | 56.1 | 56.8 |
| Content of styrene unit | wt % | 24.5 | 24.9 | 23.8 | 24.4 |
| Molecular weight distribution | — | 1.24 | 1.50 | 1.18 | 1.12 |
| Fuel cost saving properties tanδ (70° C). | — | 0.095 | 0.107 | 0.100 | 0.112 |
| Tensile strength at break | MPa | 15.5 | 14.2 | 16.4 | 13.9 |

What is claimed is:

1. A process for producing a conjugated diene-based polymer, comprising polymerizing a monomer component containing a conjugated diene compound and a silicon-containing vinyl compound using a polymerization initiator represented by the following formula (1)

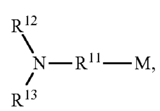

(1)

wherein, $R^{11}$ represents a hydrocarbylene group having 6 to 100 carbon atoms and is a group represented by the following formula (1-A)

$$-(CH_2)_n-R^{14}- \quad (1\text{-A}),$$

wherein, $R^{14}$ represents a hydrocarbylene group comprised of a structural unit derived from a conjugated diene compound and/or a structural unit derived from an aromatic vinyl compound, and n represents an integer of 1 to 10, $R^{12}$ and $R^{13}$ represent a hydrocarbyl group optionally having a substituent, or a trihydrocarbylsilyl group, or $R^{12}$ and $R^{13}$ are bonded to represent a hydrocarbylene group optionally having, as a hetero atom, at least one kind atom selected from the atomic group consisting of a silicon atom, a nitrogen atom and an oxygen atom, and M represents an alkali metal atom.

2. The process for producing a conjugated diene-based polymer according to claim 1, wherein $R^{14}$ is a hydrocarbylene group comprised of 1 unit to 10 units of structural units derived from isoprene.

3. The process for producing a conjugated diene-based polymer according to claim 1, wherein a compound containing a nitrogen atom and/or a silicon atom is allowed to react with an active end of a polymer produced by polymerization.

4. The process for producing a conjugated diene-based polymer according to claim 3, wherein the compound containing a nitrogen atom and/or a silicon atom is a compound containing a nitrogen atom and a carbonyl group.

5. A conjugated diene-based polymer produced by the process according to claim 1.

6. A conjugated diene-based polymer composition comprising the conjugated diene-based polymer according to claim 5 and a reinforcing agent, wherein the content of the reinforcing agent is 10 parts by weight to 150 parts by weight, per 100 parts by weight of the conjugated diene-based polymer.

* * * * *